May 2, 1944.　　　　A. J. FETTIG　　　　2,348,168
ACCOUNTING MACHINE AND THE LIKE
Filed Aug. 24, 1940　　　11 Sheets-Sheet 3

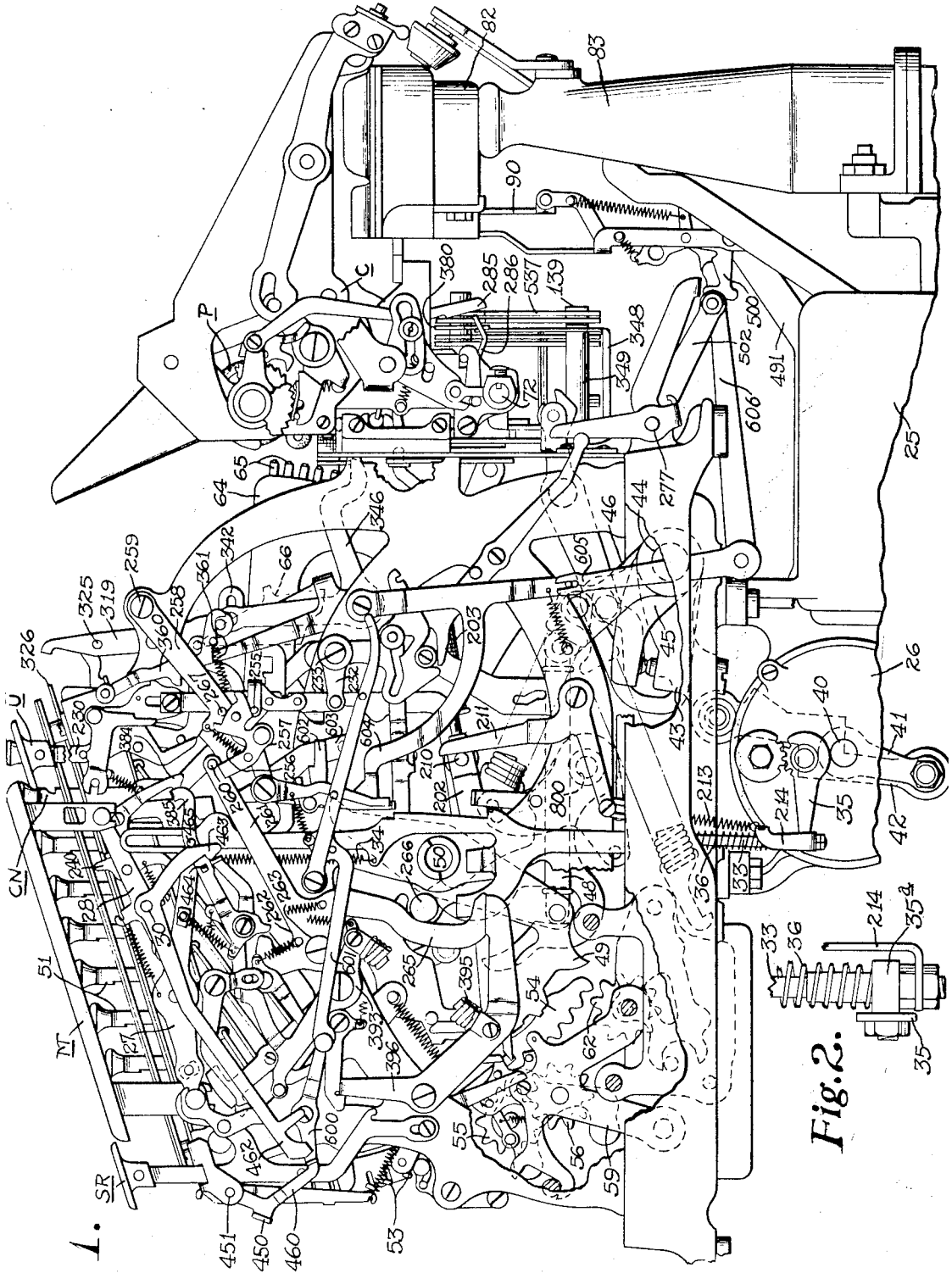

INVENTOR
Arthur J. Fettig
BY Davis, Lindsey, Smith & Shonts
ATTORNEYS

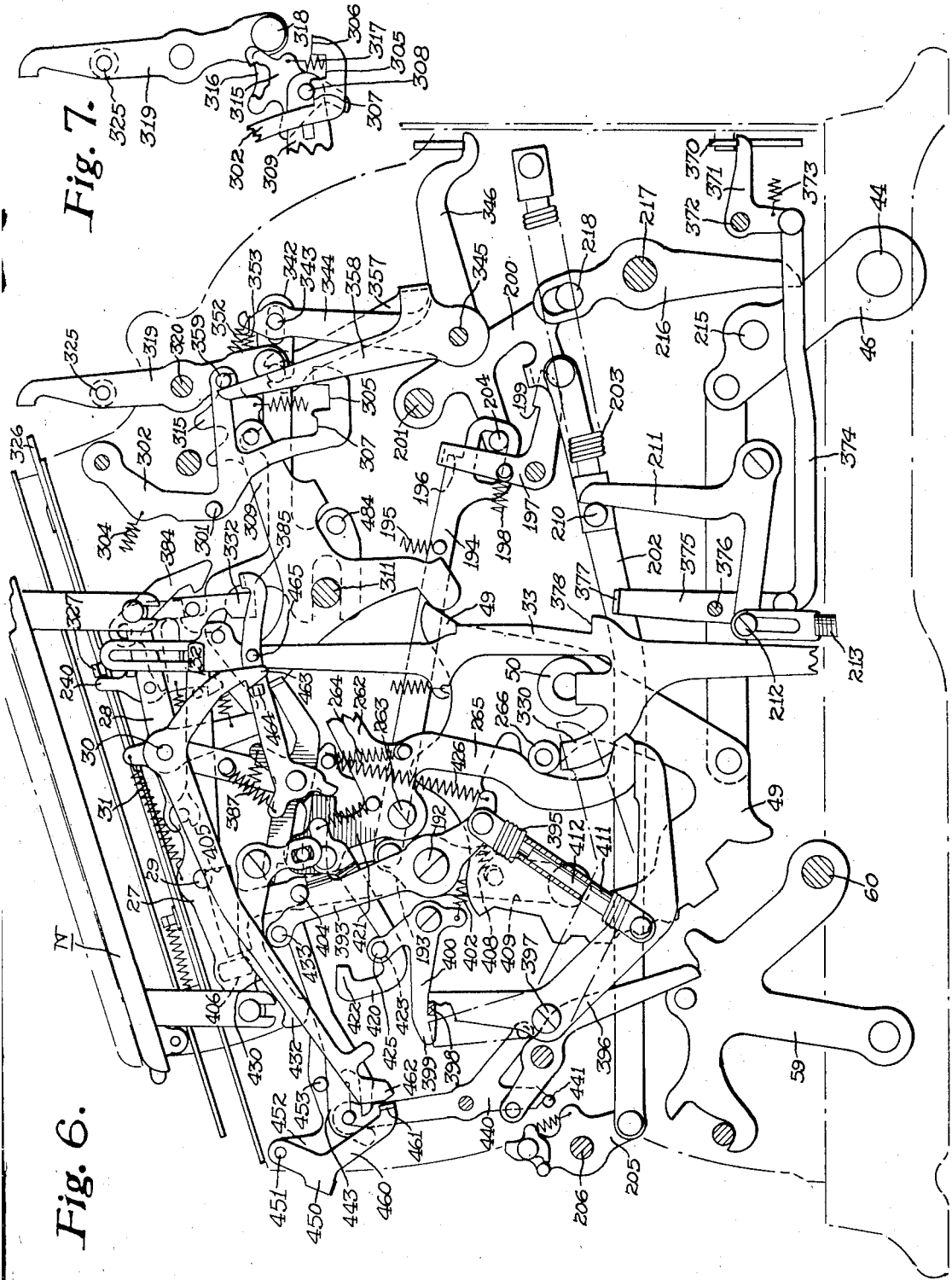

May 2, 1944. A. J. FETTIG 2,348,168
ACCOUNTING MACHINE AND THE LIKE
Filed Aug. 24, 1940 11 Sheets-Sheet 5

BY Arthur J. Fettig
Davis, Lindsey, Smith & Shonts
ATTORNEYS

May 2, 1944.  A. J. FETTIG  2,348,168
ACCOUNTING MACHINE AND THE LIKE
Filed Aug. 24, 1940  11 Sheets-Sheet 6

INVENTOR
Arthur J. Fettig
BY
Davis, Lindsey, Smith + Shonts
ATTORNEYS

May 2, 1944.  A. J. FETTIG  2,348,168
ACCOUNTING MACHINE AND THE LIKE
Filed Aug. 24, 1940  11 Sheets-Sheet 7

INVENTOR
Arthur J. Fettig
BY
Davis, Lindsey, Smith & Shonts
ATTORNEYS

May 2, 1944. A. J. FETTIG 2,348,168
ACCOUNTING MACHINE AND THE LIKE
Filed Aug. 24, 1940 11 Sheets-Sheet 8
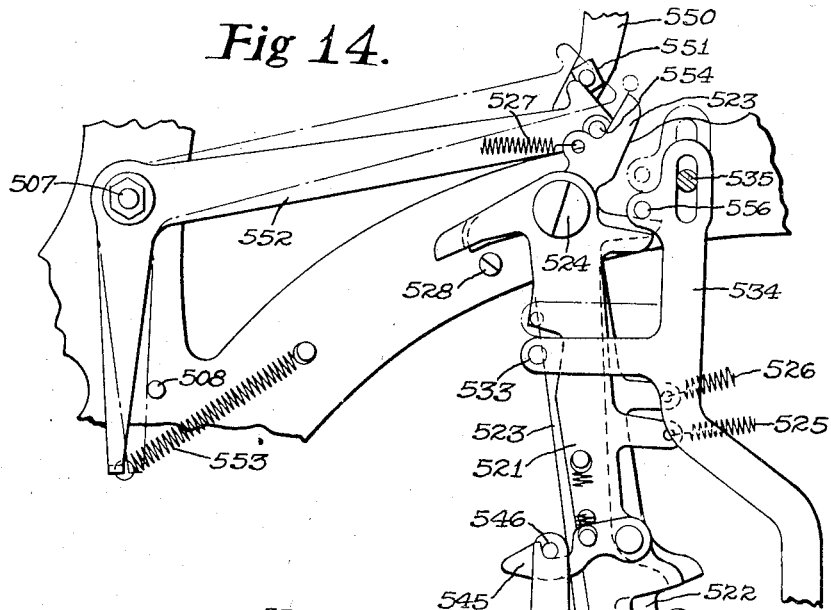
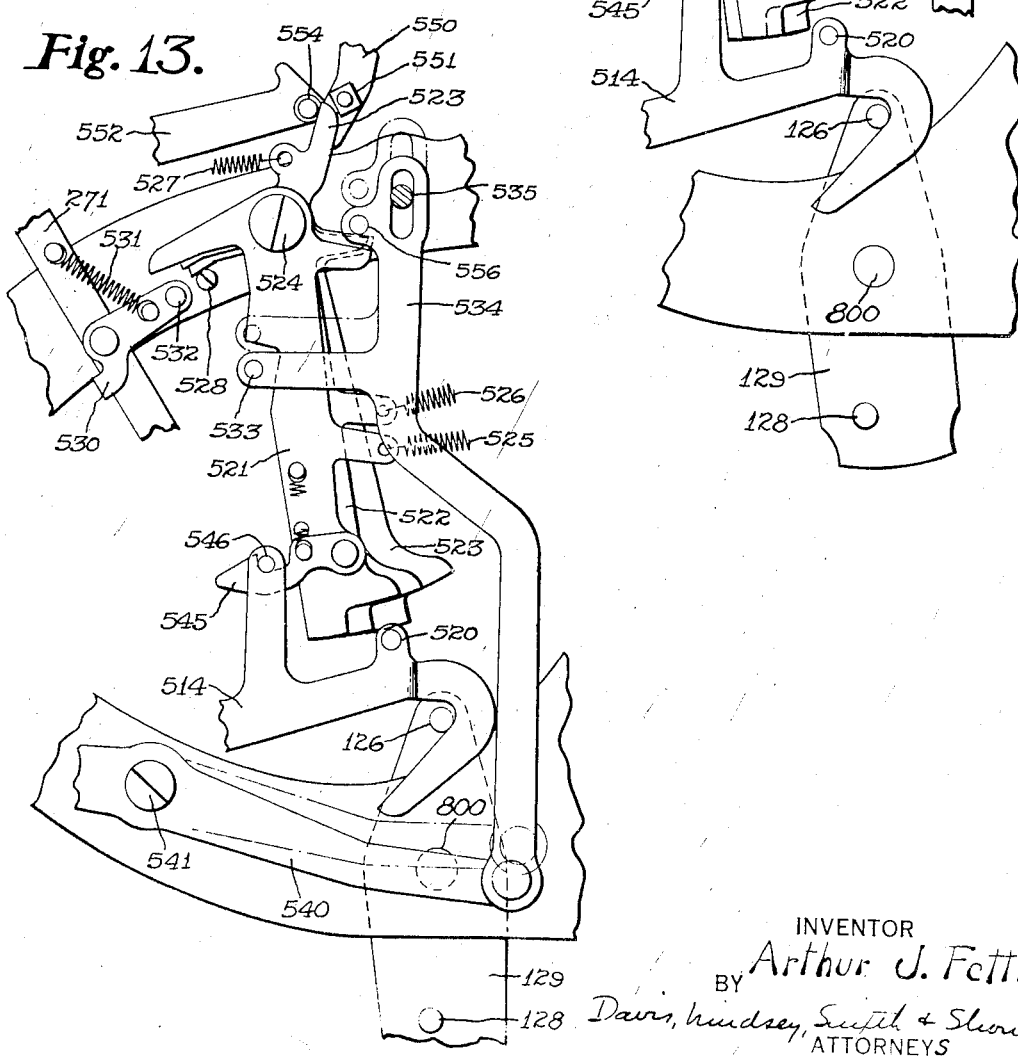
INVENTOR
BY *Arthur J. Fettig*
Davis, Lindsey, Smith & Shonts
ATTORNEYS May 2, 1944.  A. J. FETTIG  2,348,168
ACCOUNTING MACHINE AND THE LIKE
Filed Aug. 24, 1940  11 Sheets-Sheet 9

INVENTOR
Arthur J. Fettig
BY
Davis, Lindsey, Smith & Shonts
ATTORNEYS

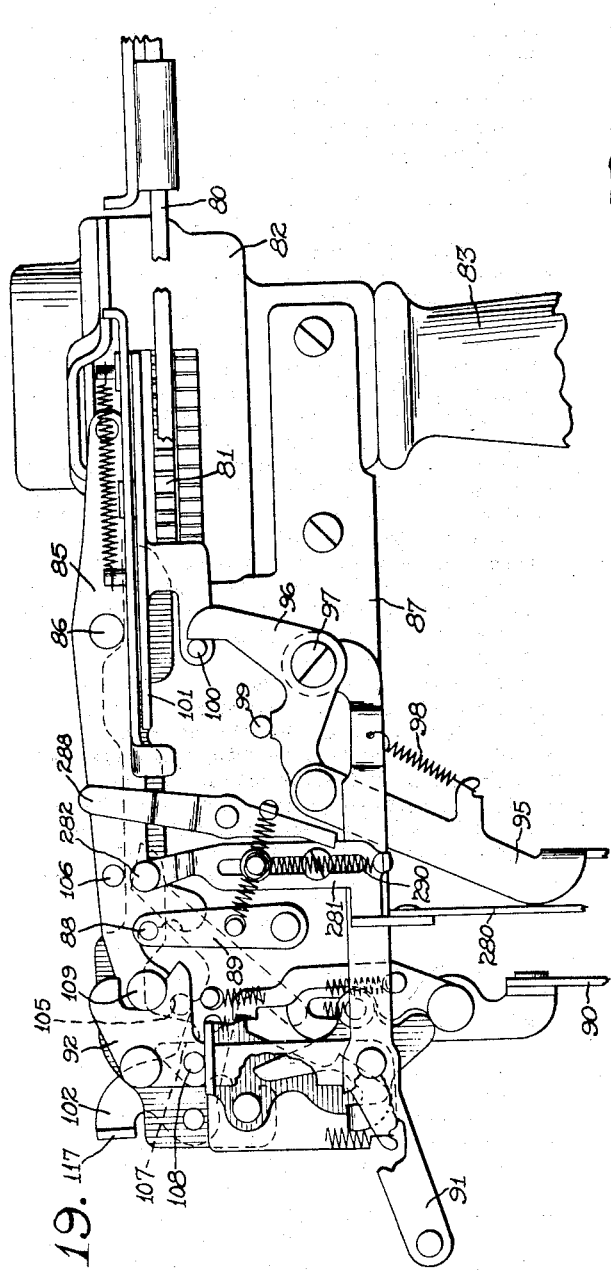
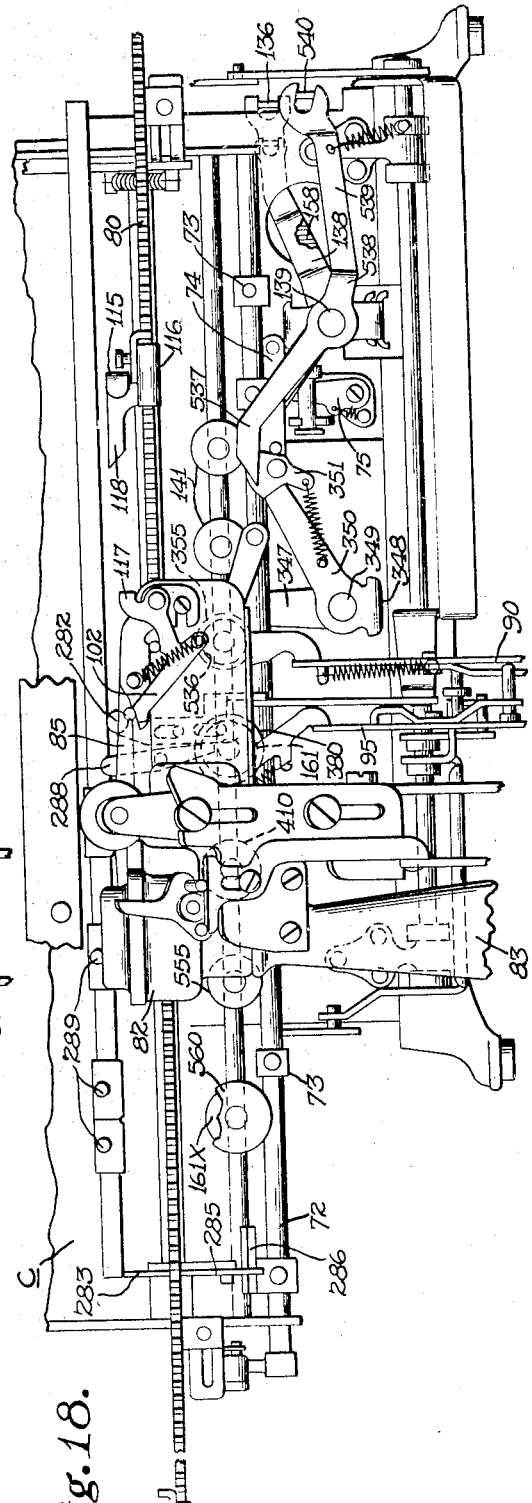

Patented May 2, 1944

2,348,168

UNITED STATES PATENT OFFICE 2,348,168

ACCOUNTING MACHINE AND THE LIKE

Arthur J. Fettig, Detroit, Mich., assignor to Burroughs Adding Machine Company, Detroit, Mich., a corporation of Michigan Application August 24, 1940, Serial No. 354,130

24 Claims. (Cl. 235—60)

This invention relates to accounting machines or the like of the class used for entering data on columnar forms, such for example as calculating machines used in accounting or bookkeeping work for printing entries in different columns on accounting or bookkeeping forms, performing the required calculations and printing the results of said calculations on the forms.

One type of work for which the invention is to be used is the posting of customers' accounts in banks, which involves the picking up of the old balance of an account, the entry of one or more debit items, usually representing checks drawn by the customer against the account and paid by the bank, and/or a credit entry usually representing cash or checks payable to the customer and deposited with the bank for collection, and the calculation and printing of the new balance. In many banks it is the practice to keep analysis records for determining, for example, the profit or loss to the bank in handling the accounts of certain classes of customers or for determining what charge, if any, is to be made for handling each account for a given period in order to avoid loss or make a minimum profit, or for other purposes. Such analysis records are usually made on detachable portions of the customers' statement forms for convenience in making the records and subsequently detaching the record portions from the statement forms before the latter are sent to the customers.

An object of the invention is to provide an improved machine of the character above specified.

A further object of the invention is to provide an improved machine of the class specified for use in accounting or bookkeeping work, particularly work involving the keeping of analyses or the like records such as referred to above.

It is desirable that the production of analyses records such as mentioned above shall require the least amount of time of the machine and the operator and shall require the least amount of physical effort and attention of the operator. A further object of the invention, accordingly, is to provide a machine which will facilitate the production of such records by operating rapidly with a high degree of automaticity.

The data of an analysis record, produced as above stated, are printed in a predetermined column, conveniently the last column, on the work form. The machines usually employed for this work have traveling carriages for varying the relative positions of the work sheet and printing mechanism so that the printing impression produced by the printing mechanism can be made in different selected columns on the work sheet. The tabulation of the carriage from columnar position to columnar position is usually controlled by an automatic tabulating mechanism. Usually, such a machine is provided with power operated means for returning the carriage in the opposite direction. Ordinarily, the carriage would tabulate from the last preceding columnar position into the analysis columnar position but, if the last needed operation of the machine for completing the line of entries on the work form is the operation while the carriage is in the column preceding the analysis column, there is no need for the carriage to tabulate into the analysis column. However, the data to be entered in the analysis column are based upon the character of an item, such as a deposit, entered in a preceding column other than the last column preceding the deposit column. If the operator had to wait, say until the time for initiating the machine operation for an entry in the last column preceding the analysis column, before conditioning the carriage return means for return of the carriage directly from said last preceding columnar position without tabulation into the analysis columnar position, the operator would be required to carry in mind through the intervening operations the fact that no data were to be entered in the current line in the analysis column or would be required to refer again to the deposit entry to determine whether or not analysis data must be entered in the analysis column before the operator could perform the act which would determine whether the carriage would tabulate into the analysis columnar position or return from the preceding columnar position. Furthermore, if the operation performed by the machine when the carriage is in the columnar position immediately preceding the analysis column is an automatic operation, the operator would have no opportunity at that time to do anything to cause the carriage to return immediately at the end of said automatic operation without tabulating into the analysis column. It is a further object of the invention to provide a machine of the character specified with means presettable when the carriage is in a columnar position preceding but nonadjacent to the analysis column to determine whether the carriage shall move into the analysis columnar position or be returned directly from the columnar position immediately preceding the analysis columnar position and without moving into the analysis columnar position.

The machine described in detail hereinafter may also perform an automatic cycle of operation under certain circumstances, as later described, when the carriage is in the position corresponding to the column for the entries, such as deposits, on which the analysis data are based, when there is no entry to be made in said column and, therefore, no analysis data to be entered in the analysis column. In that case, the automatic cycle in the deposit column results from a manipulation of a manual control member while conditioning the machine for an operation while the carriage is in a position preceding the deposit columnar position and the operator would have no opportunity, while the carriage is in the deposit columnar position, to do anything to cause direct return of the carriage from the columnar position preceding the analysis columnar position without tabulation to the latter position. Looking at it in another way, if the act determining whether the carriage would tabulate into the analysis column or return without tabulating into the analysis column were always to be performed by the operator while the carriage occupied the deposit columnar position, the machine would have to be set up so that it would never operate automatically with the carriage in the deposit columnar position. A further object of the invention is to control the presetting of the selective carriage return control means by the same means which conditions the machine for automatic cycling when the carriage reaches a predetermined column such as the deposit column.

It is to be understood that the invention is not restricted to uses in which analysis data are entered in the column referred to above, for convenience, as an "analysis column." Rather, it is to be understood that the invention is to be used also when entries other than analysis data are entered in some lines but not in other lines in a column which might be designated more accurately by another name and also when the entering or nonentering of data or items in such a column depends upon the entering of items other than deposits and/or upon the character of such items entered in a preceding nonadjacent column which is not necessarily a "deposit column."

A Burroughs high keyboard machine provided with one embodiment of the invention is illustrated by way of example in the accompanying drawings in which:

Figure 1 is a right side elevation of the machine with the casing removed and with the various parts in their normal positions, a few of the parts being broken away for clearness of illustration;

Fig. 2 is a detail illustration of certain parts of Fig. 1;

Figure 8:
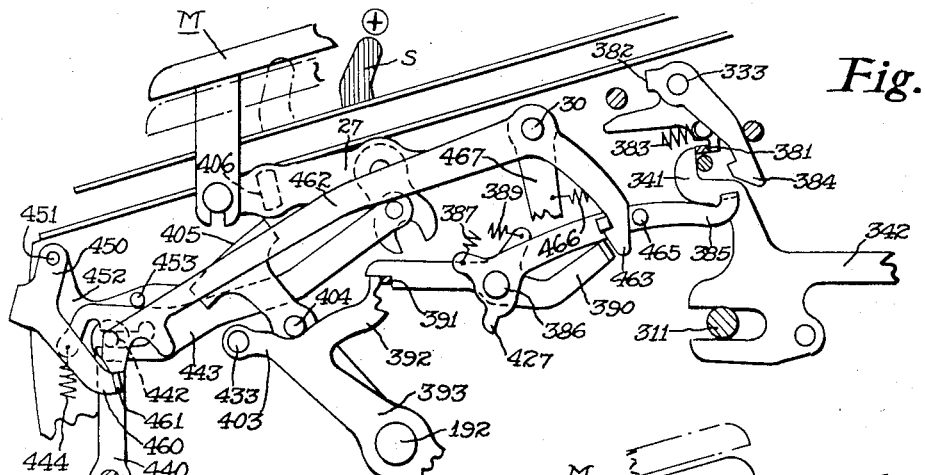
Figure 9:
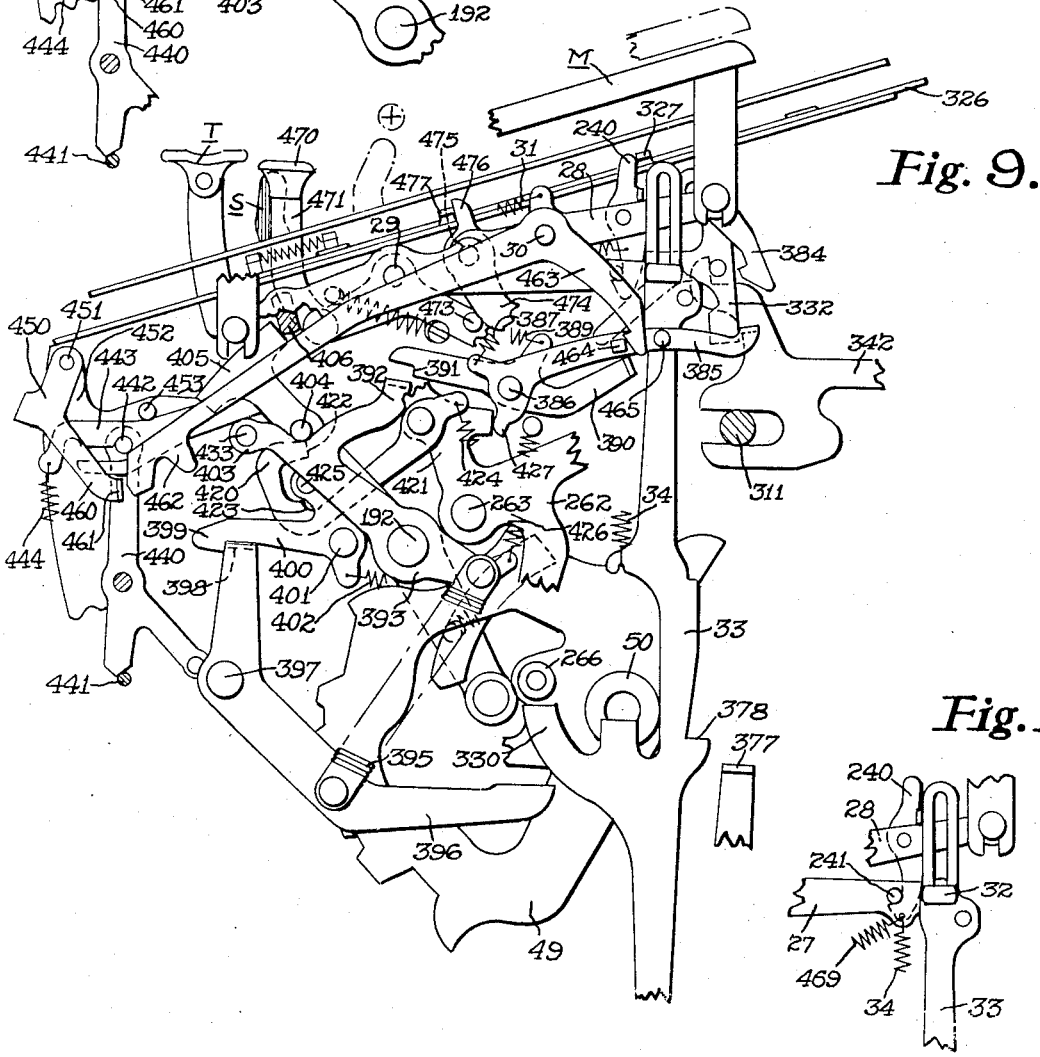
Figure 10:
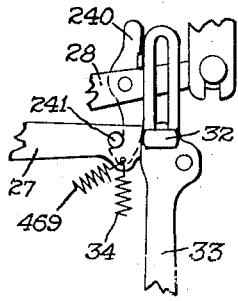
Figure 11:
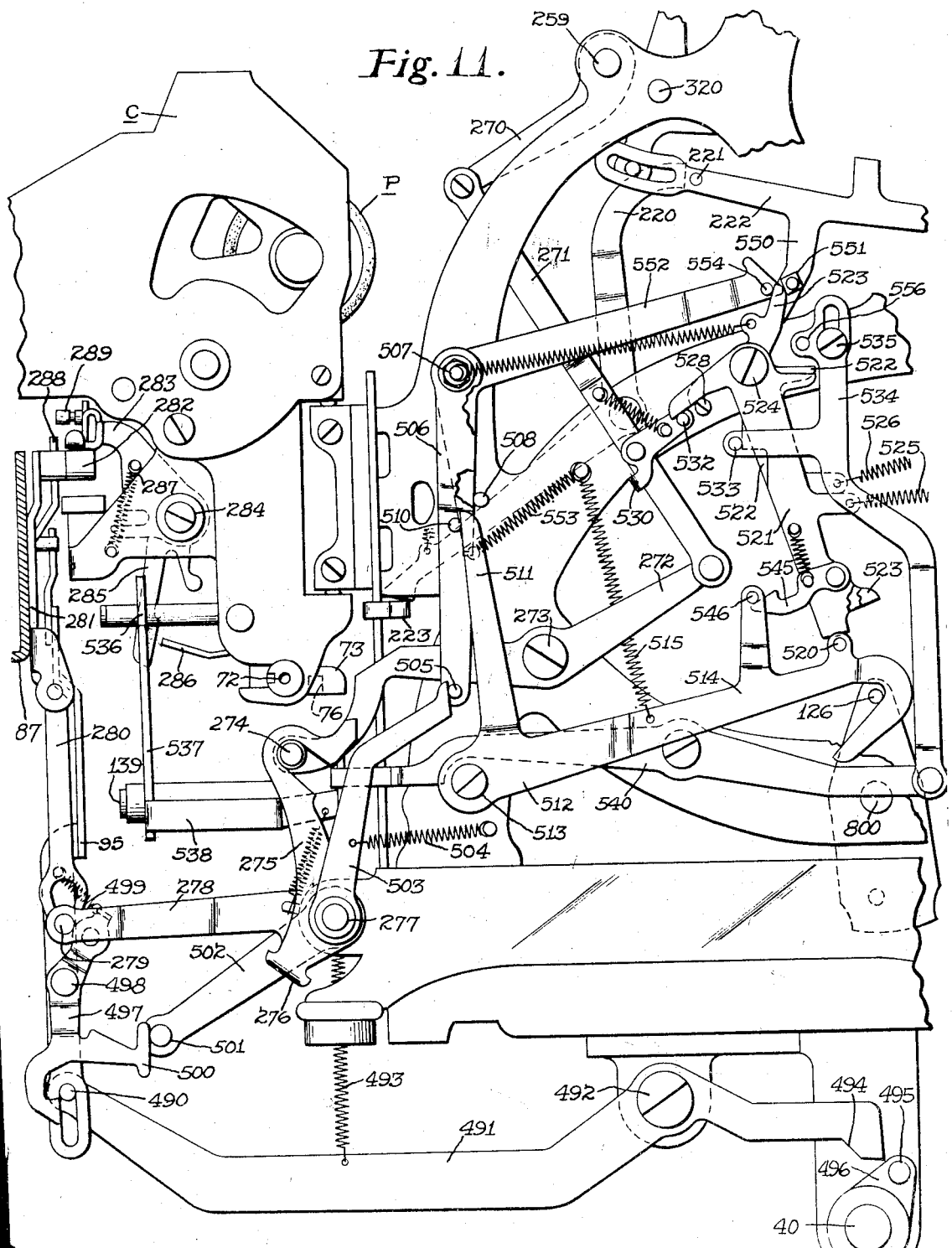
Figures 12, 15:
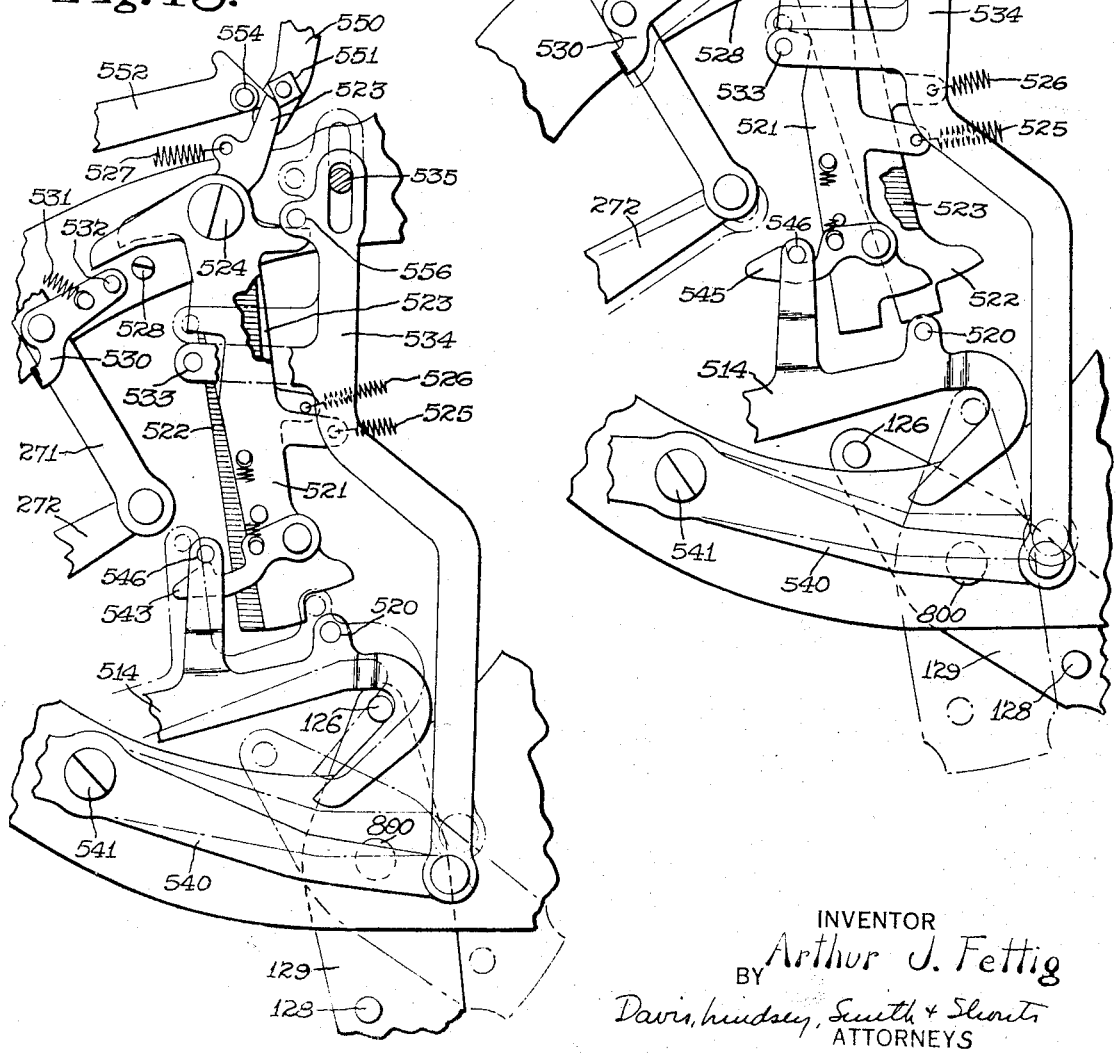
Figure 17:
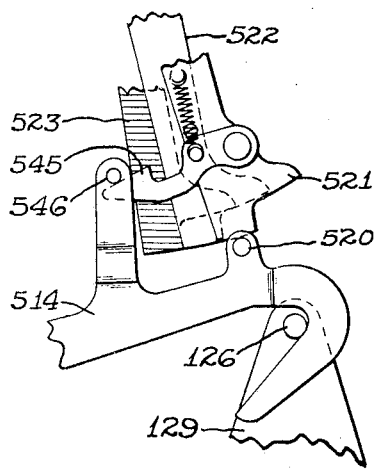
Figure 16:
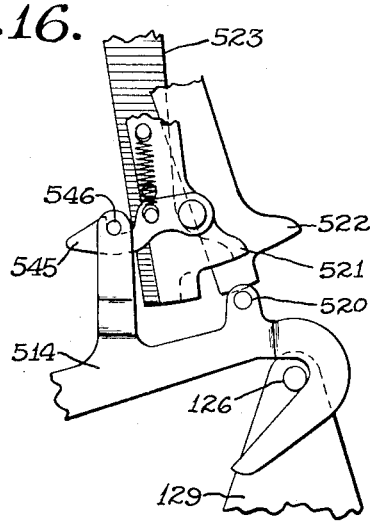
Figure 20:
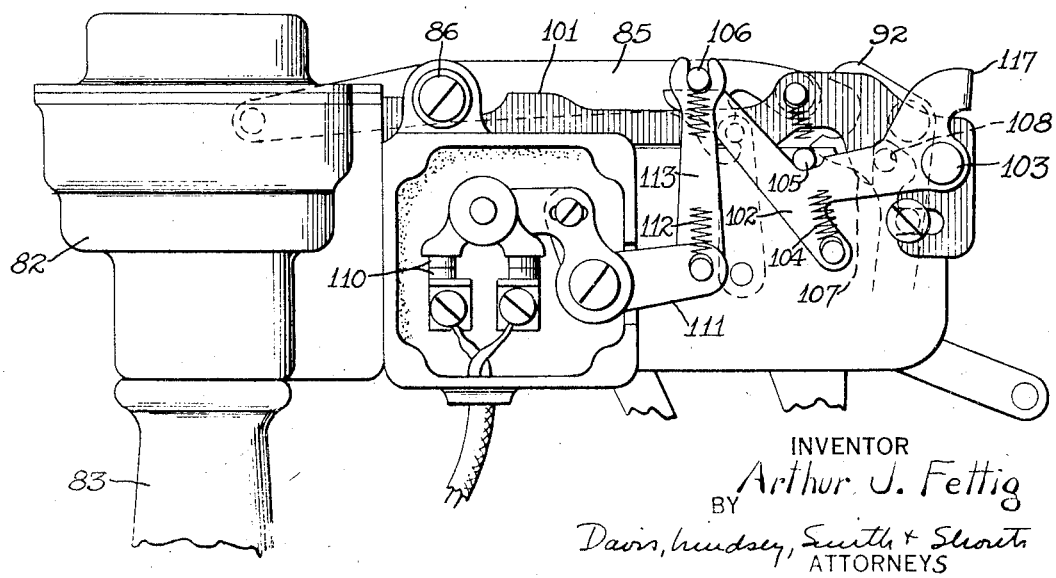
Figure 21:
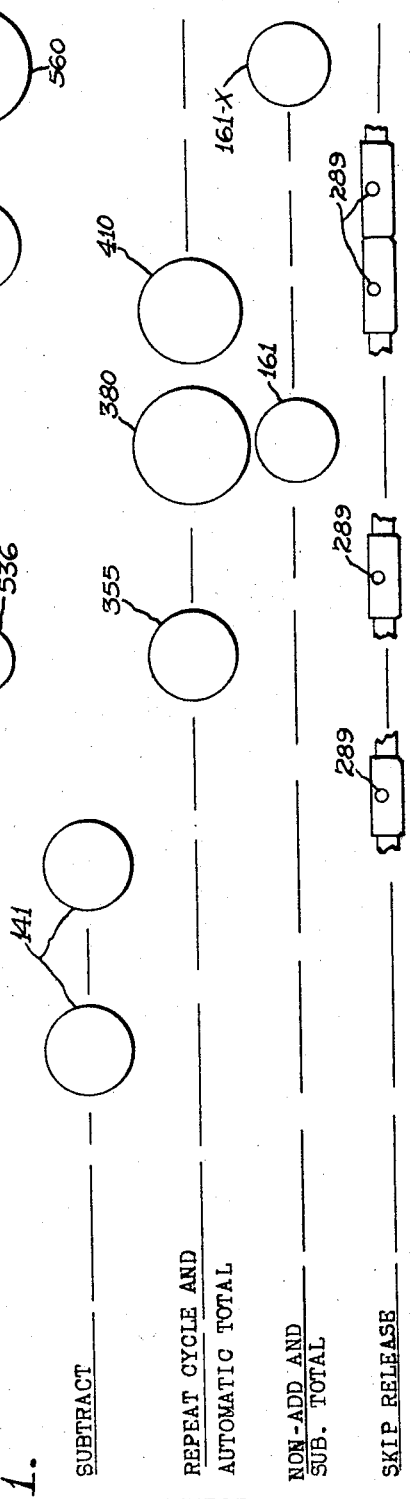

Fig. 6 is a right side elevation of the machine showing certain parts associated more especially with the automatic total control mechanism, these parts being shown in the positions they occupy at the time they have just moved to automatic total-taking or subtotal-taking position but before the cycle of operation of the machine has commenced, other parts shown in Fig. 1 being omitted from Fig. 6 for clearness;

Fig. 7 is a detail illustration of certain parts of Fig. 6;

Fig. 8 is a right side view illustrating some of the parts of Fig. 6 in the positions they occupy when an automatic total or subtotal-taking operation is prevented by reason of the crossfooter register not being in a position in agreement with the sign of the total contained in said register;

Fig. 9 is a right side view of the parts shown in Fig. 8 and of some further parts of Fig. 6 in the positions they occupy when an automatic total or subtotal-taking operation has been prevented as in Fig. 8 but after the machine has been given a cycle of operation in which the crossfooter register has been moved to the position corresponding to the sign of the total contained therein;

Fig. 10 is a detail illustration of certain parts shown in Figs. 6 and 9;

Fig. 11 is a left side view of some of the parts at the back and on the rear left side of the machine and which are more particularly concerned with the control of the carriage movements, the parts being shown in their normal positions;

Fig. 12 is a detail illustration of certain parts controlling the presettable selective return of the carriage, the parts being shown in the positions which they occupy at the end of the forward stroke of a cycle performed while the carriage is in the "deposit" columnar position;

Fig. 13 is similar to Fig. 12 but shows the parts in the positions which they occupy before the start of a cycle of operation of the machine after the carriage reaches the second balance or total-taking columnar position;

Fig. 14 is also similar to Fig. 12 but shows the parts in the positions which they occupy when the total or subtotal key has been depressed but before the start of the total or subtotal-taking cycle of operation;

Fig. 15 is also similar to Fig. 12 but shows the parts in the positions which they occupy when the carriage reaches the "analysis" columnar position;

Fig. 16 is a detail illustration of certain of the parts of Fig. 12 in the positions which they occupy when the carriage is in the first of two "balance" columnar positions and the total or subtotal key is in depressed position;

Fig. 17 is a detail illustration of certain of the parts of Fig. 12 in the positions which they occupy when the carriage is in the second of the two "balance" columnar positions but the selective carriage return means is conditioned to permit the carriage to tabulate to the analysis columnar position;

Fig. 18 is a partial rear view of the machine;

Fig. 19 shows more particularly certain parts of the carriage return mechanism as viewed from the front of the machine;

Fig. 20 shows certain parts of the carriage return mechanism as viewed from the rear of the machine; and Fig. 21 is a schematic illustration of an example of work performed by the machine and indicates the relation between the carriage positions and the times when certain control elements become effective while the machine is set up for the illustrated example of work.

The illustrated embodiment of this invention for accomplishing the heretofore mentioned desired results is shown as applied to the well-known Burroughs high keyboard machine illustrated in many patents, as, for example, the Pasinski patents, No. 1,778,506 and No. 1,911,768, for which reason the general construction of the machine will be described only very briefly, reference being had to the foregoing and other issued patents for further details of the general construction. It will be obvious to those skilled in the art that the invention may be applied to other types of calculating machines.

General construction

The general operating and calculating mechanisms of the illustrated machine may be given cycles of operation, each comprising a forward and a return stroke, by an electric drive motor 25 operating through a clutch 26, as described in the Vincent Patent No. 866,750, the motor and clutch being controlled as disclosed in the Bindschedler patents, Nos. 1,658,036 and 1,773,164 from a motor bar M. The front and rear stems of said motor bar M (Figs. 1 and 6) are supported on studs on levers 27 and 28 pivoted on shafts 29 and 30, respectively, and having a stud and slot connection with each other between said pivots. The levers 27 and 28 are urged clockwise and counterclockwise, respectively, by a spring 31 connected between said levers and thus urging the motor bar M upward to normal position. The rear end of the lever 27 has a stud 32 (Fig. 10) engaging in a slot in a control link 33. A spring 34 is connected between the lever 27 and the link 33 to urge said link upward relatively to said lever and tends to maintain the stud on said lever at the lower end of the slot in said link. The lower end of the link 33 passes through an opening in a stud 35ᵃ pivotally secured in the end of an arm 35 through which the usual clutch and motor switch are controlled as shown in said Bindschedler patents. A spring 36 surrounding the link 33 and compressed between a shoulder on said link and the arm 35 urges the link and arm upward and downward, respectively, relatively to each other to the limit determined by nuts threaded on the lower end of the link.

Depression of the motor bar M rocks the levers 27 and 28 counterclockwise and clockwise, respectively, and the rear end of lever 27 acting through the spring 34 raises the link 33 and the forward end of the arm 35 to close the motor switch and connect the clutch to give the machine a cycle of operation.

For each cycle, the clutch shaft 40 (Fig. 1) and the crank arm 41 thereon rotate one revolution and, through the link 42, rock an arm 43 first clockwise and then counterclockwise about a shaft 44 on which said arm is freely rockably mounted. The arm 43 has an abutment cooperating with an abutment on an arm 45 secured on the shaft 44 whereby the arm 43 when driven clockwise also drives the arm 45 and shaft 44 clockwise in which is known as the "forward stroke" of the cycle. An arm 46 also secured to the shaft 44 is connected to springs which return the shaft 44 and arms 45 and 46 counterclockwise in the "return stroke" of the cycle while the motor, clutch and arm 43 generally run somewhat ahead of the arm 45. The arm 46 is connected through a link 48 (Figs. 1 and 6) to the usual full-stroke sector 49 secured on the shaft 50 to which the usual hand crank may be attached for cycling the machine manually when desired.

The amount entering means of the illustrated machine comprises a suitable number of rows or bank of keys 51 (Figs. 1 and 3) which, when depressed, rock individual bell cranks 52 which move stop wires 53 into position to arrest the amount actuator sectors 54 (Fig. 1), associated with the several banks of keys, at positions corresponding to the depressed keys in the respective key banks when said actuators descend from their normal positions during the forward stroke of the cycle. During the return stroke, the lowered actuators 54 rise again to their normal positions and the depressed keys 51 are restored to normal.

Figure 3:
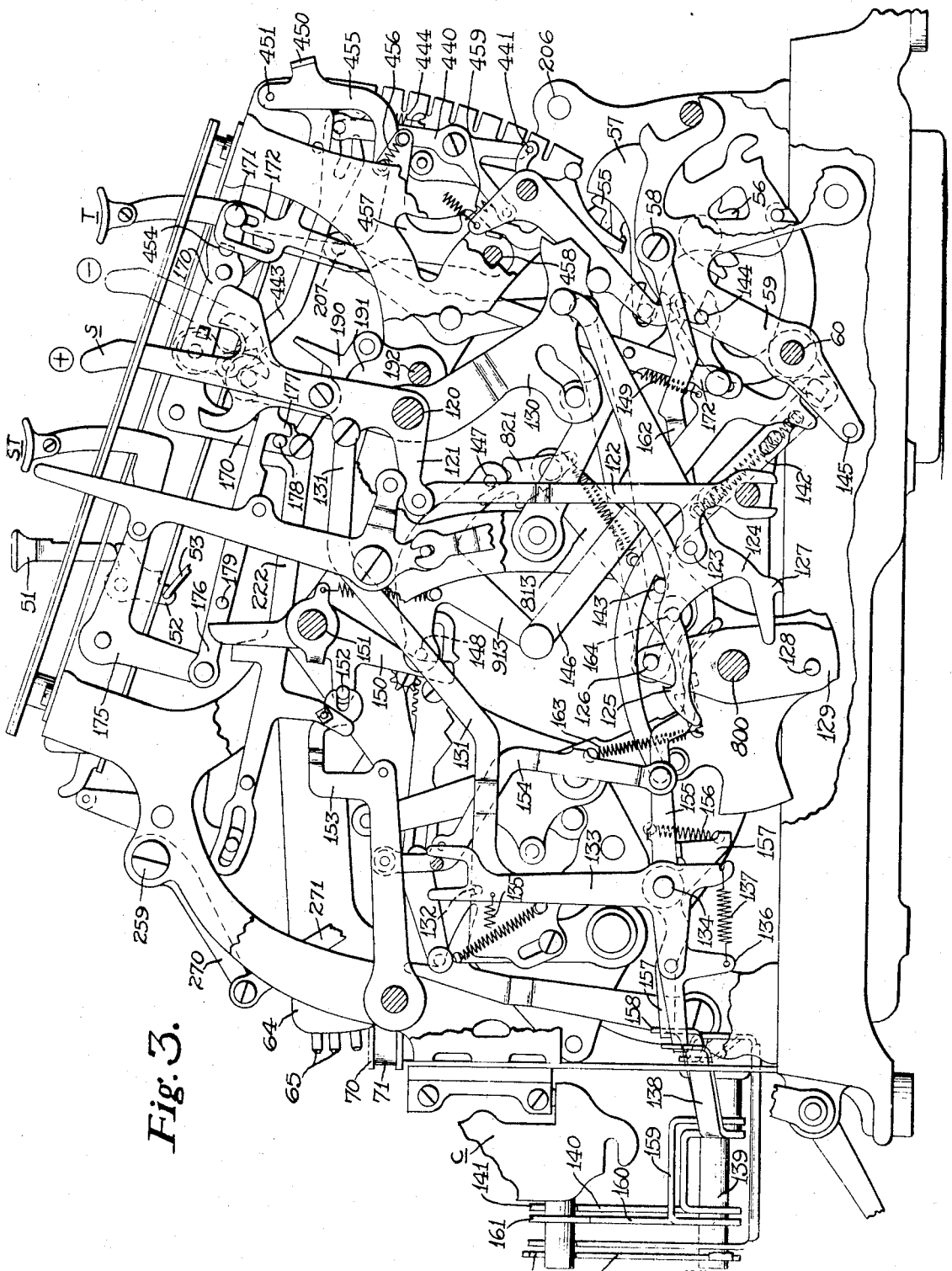
Fig. 3 is a left side elevation showing certain operating and control parts located on or near the left side of the machine.

The illustrated machine has a main adding and subtracting register or crossfooter of the "tumbling" type having a plurality of pairs of meshing pinions 55 and 56 (Figs. 1 and 3). This main register or crossfooter is constructed and operated substantially as disclosed in the Pasinski patents, Nos. 1,778,506 and 1,911,768. The pinions 55 and 56 are supported in a "tumbling" frame 57 (Fig. 3) pivotally supported by studs 58 in a main frame 59 rockably mounted on the shaft 60. The "tumbling" frame 57 is normally positioned so that, when moved toward the actuators 54, by rocking of the main frame 59 about the shaft 60, the "add" pinions 55 of each pair of pinions will mesh with the corresponding actuators but the frame 57 may be tumbled to cause the "subtract" pinions 56 to mesh with the actuators upon movement of the register toward the actuators. For amount entering operations, i. e., addition or subtraction, the pinions 55 or 56 are out of mesh with the actuators 54 throughout the descent of the actuators but the pinions are in mesh with the actuators during their return to normal in the return stroke of the amount entering cycle so that amounts entered on the keys 51 will be entered into the register. In total-taking operations, the pinions 55 or 56 are in mesh with the actuators during the forward stroke of the total-taking cycle and the actuators 54 descend until the corresponding pinions are arrested. The pinions are disengaged from the actuators while the latter rise again to their normal positions during the return stroke of the total-taking cycle. In subtotal-taking cycles, the pinions 55 or 56 are meshed with the actuators during both the forward and return strokes so that the total withdrawn from the register in the forward stroke is reentered during the return stroke. In adding, positive total taking and positive subtotal taking, the pinions 55 are meshed with the actuators 54 but, in subtracting, negative total taking and negative subtotal taking, the pinions 56 are meshed with the actuators.

For the add-subtract crossfooter 55—56, there is a tens-transfer mechanism effecting both "carries" and "borrows" by means of an extra step of return movement of the actuators 54 beyond their normal positions as disclosed in the Rinsche Patent No. 1,172,484. Portions of this transfer mechanism arrest the register pinions in their positive "0" positions in positive total-taking and positive subtotal-taking operations and in their positive "9" positions in negative total-taking and negative subtotal-taking operations. A "fugitive 1" mechanism also like that disclosed in the Rinsche Patent No. 1,172,484 is provided to enable numerically correct negative as well as positive totals to be obtained.

The illustrated machine also has a multiple register line comprising a plurality of adding registers 62 (Fig. 1) constructed and operated as disclosed in the Pasinski Patent No. 1,911,768 and provided with a tens-transfer mechanism also like that disclosed in said Pasinski patent and in the Pasinski Patent No. 1,774,289. The registers 62 are out of engagement with the actuators 54 while the machine is at rest.

The printing mechanism in the illustrated machine comprises, for each actuator 54 and corresponding bank of keys 51, a set of printing type 65 (Fig. 1) carried on the rear end of the lever 64, the forward end of which carries the actuator 54. Thus, at the end of the forward stroke of a cycle, the types corresponding to the amount entered on the keys 51 or the total or subtotal taken from the crossfooter 55—56 or from a register 62 are positioned at the printing line. These type are then driven by hammers 66 against record material held about a platen roller P. The printing hammers are controlled, as in the usual machine of the type illustrated and as disclosed in various patents, to secure the desired printing in selected orders.

Printing is effected in selected columns on the work sheet, the selection of columns being controlled by columnar printing control means which, in the form provided in the illustrated machine, comprises a traveling carriage C carrying the platen P and longitudinally movably mounted on the fixed frame of the machine. The carriage is urged toward the left, as viewed from the front of the machine, by a spring in a drum 70 (Fig. 3) to which is secured one end of a tape 71, the other end of which is secured to the carriage. Normally, the carriage tabulates toward the left from one columnar position to the next near the end of each cycle of the machine under the control of a tabulating mechanism like that disclosed in the Rinsche Patent No. 1,516,685. The tabulating mechanism comprises a stop bar 72 (Fig. 18) rockably mounted on the carriage and carrying a plurality of column stops 73 adjustably positioned along the bar 72 in accordance with the columnar positions in which they are to hold the carriage by engagement with an abutment 74. A tabulating pawl 75 moves downward during the forward stroke of each cycle and, when it returns upward during the return stroke, it normally engages the column stop 73 which is engaged with the abutment 74 and rocks said stop and the bar 72 to disengage said stop from the abutment 74. The carriage immediately moves toward the left as viewed from the front or toward the right as viewed in Fig. 18, and thereby carries the said stop 73 away from the pawl 75 whereupon the bar 72 normally is immediately rocked back to its normal position by the usual spring so that the stop 73 for the next column is in position to engage the abutment 74 and arrest the carriage in the next columnar position. The carriage may be normalized, i. e., the tabulating mechanism may be disabled, by means of the usual "carriage normal" key controlling means, such as disclosed in the Lundgren Patent No. 1,195,599, which disables the tabulating mechanism and so permits the carriage to remain stationary as long as said key remains depressed. The machine is also provided with the usual "vertical spacing and carriage return" motor bar SR which, when depressed in one manner, will disable the tabulating mechanism during the cycle of machine operation initiated by depression of said bar and cause the carriage to remain stationary at the end of said cycle.

After completion of a line of entries, the carriage is returned toward the right as viewed from the front or toward the left in Fig. 18 by a power operated carriage return mechanism (Figs. 18, 19 and 20). As disclosed in detail in the Rinsche Patent No. 1,580,534, a rack bar 80 on the carriage meshes with gear teeth on the periphery of the driven member 81 of a clutch located in a housing 82 and powered through a drive means in the housing 83 from the drive motor 25 of the machine. As disclosed in said Rinsche patent, a lever 85, pivotally mounted at 86 on a stationary plate 87, causes engagement of the clutch when it is rocked clockwise in Fig. 19 (counterclockwise in Figs. 18 and 20) and disengages the clutch when said lever is returned to its normal position of Fig. 19. The clutch control lever 85, after being moved to either position, is yieldingly held in such position by a stud 88 on a pivoted spring urged detent lever 89 engaging in one or the other of a pair of notches in said clutch control lever. In the illustrated machine, the clutch control lever 85 may be controlled from the lower motor bar SR and the paper carriage through mechanism including the parts 600—606 in the manner in which the corresponding carriage return clutch control member 73 of my copending application Serial No. 299,682, filed October 16, 1932, is controlled through the mechanism including the parts 174—188, 190—196, 200—206 and 211—222 from the lower motor bar 170 and paper carriage of said copending application. The carriage return clutch control member 85 is also controlled by a link 95 pivotally connected at its upper end to the left-hand arm (Fig. 19) of a bell crank 96 pivotally mounted on a stud 97 on the stationary plate 87 and urged upward by a spring 98 until stopped by engagement of the bell crank 96 against a stud 99 on the stationary plate 87. The upper arm of the bell crank engages against the right-hand side (Fig. 19) of a stud 100 carried by a downwardly projecting arm of a slide 101 slidably mounted on the stationary plate 87. As most clearly shown in Fig. 20, a member 102 is pivotally mounted on a stud 103 on the slide 101 and urged clockwise in Fig. 20 (counterclockwise in Fig. 19) by a spring 104 into contact with a stud 105 fixed in the plate 87. Normally, the slide 101 and member 102 are in the position of Fig. 19 where the stud 105 engages the upper edge of the member 102 at a point which is nearer to the pivot 103 than is the notch in which the stud 105 engages in Fig. 20. In the Fig. 19 position the stud holds the member 102 with its end below a stud 106 on the lever 85 which is in the normal clutch-disengaging position. When the link 95 is pulled down by means to be described later, the slide 101 is moved to the left in Fig. 19 and to the right in Fig. 20 to the position shown in the latter figure and a projection 107 on the slide engages a stud 108 on the member 92 to move the latter to disengage its notched upper end from the roller stud 109 on the clutch lever 85 and disable control of the latter by said member 92. The slide 101 carries the member 102 along to bring the notch in the upper edge of said member under the stud 105. This permits the spring 104 to rock the member 102 clockwise in Fig. 20 to the position there shown whereby the end of said member acts on the stud 106 to rock the lever 85 to engage the carriage return clutch. At the same time, a switch 110 is operated through connections 111, 112 and 113 to close the circuit of the motor 25, if it is not already closed, and to keep said circuit closed until the carriage return clutch is again disengaged. Downward movement of the link 95, therefore, results in the carriage being returned to the left in Fig. 18 which is toward the right as viewed from the front of the machine.

As the carriage moves slightly past its column 1 position, a projection 115 (Fig. 18) on a release member 116 adjustably secured on the rack bar 80 engages a lateral lug 117 (Fig. 19) on the member 102 to rock the latter counterclockwise in Figs. 18 and 20 and return the slide 101 to the position of Fig. 19 while a cam finger 118 on said release member 116 engages the roller stud 109 on the clutch lever 85 and cams the latter to the clutch releasing position whereby the switch 110 is also reopened. The carriage is then permitted to move slightly in the tabulating direction until stopped by engagement of a column stop 73 against the abutment 74.

To facilitate the insertion and removal of the record material or work sheets about the platen P, the illustrated machine is provided with an automatically controlled power operated front-feed mechanism like that disclosed in the Muller patents, Nos. 2,202,595 and 2,202,596. Portions of this mechanism are shown in Figs. 1 and 18.

The illustrated machine has both manual and automatic controls for enabling it to perform various kinds of operations. The positioning of the crossfooter for engagement of the "add" pinions 55 or the "subtract" pinions 56 for engagement with the actuators is controlled manually through the subtract lever S (Fig. 3) and automatically by the carriage, as disclosed in the Pasinski patents, Nos. 1,778,506 and 1,911,768. The "subtract" lever S pivoted at 120 has a rearward arm 121 connected to a link 122 having a stud 123 within a slot in a pitman 124. The rear portion of the pitman 124 has an upper branch having a shoulder 125 adapted to cooperate with a stud 126 and also has a lower branch having a shoulder 127 adapted to cooperate with a stud 128. The studs 126 and 128 are carried by a plate 129 secured upon the familiar 800 shaft which is rocked counterclockwise (Fig. 3) during the forward stroke and is returned clockwise during the return stroke of each cycle by the usual connections with the shaft 44. Normally, the parts occupy the + position of Fig. 3. When, however, the lever S is moved to the — position indicated in dot-and-dash line in Fig. 3, the link 122 and thus the rear end of the pitman 124 are raised to place the shoulder 125 in the path of the stud 126 so that, during the forward stroke of the cycle, the pitman will be drawn rearward. The forward end of the pitman 124 is pivotally connected to a cam lever 130 which is pivoted at 120 and "tumbles" the crossfooter frame 57 in the well-known manner. When the pitman 124 is drawn rearward, the lever 130 is rocked clockwise from its Fig. 3 position to "tumble" the frame 57 to the — position where the "subtract" pinions 56 are presented for engagement with the actuators 54. When the lever S returns to the + position, the rear end of the pitman 124 is lowered again to place the shoulder 127 in the path of the stud 128 so that, during the forward stroke of the following cycle, the pitman 124 will be moved forward to rock the cam lever 130 counterclockwise from its Fig. 3 position to tumble the frame 57 to the + position to place the "add" pinions 55 in position for engagement with the actuators 54.

The "subtract" lever S also is pivotally connected to a link 131 having, near its rear end, a notch receiving a stud 132 on a lever 133 pivotally mounted at 134. A spring 135 connected to the lever 133 urges the parts to the + position of Fig. 3. A bell crank 136 pivotally supported on a rear arm of the lever 133 can be rocked against the tension of a spring 137 clockwise from its Fig. 3 position relative to the lever 133 but cannot be rocked counterclockwise beyond its Fig. 3 position relative to the lever 133. The rear arm of the bell crank 136 engages in the forked end of one arm 138 of a yoke pivotally supported on a fixed stud 139 and having a second arm 140 positioned to be acted upon by rolls 141 adjustably mounted on the carriage C. When a carriage roll 141 moves over the arm 140 it depresses the latter and raises the arm 138 and bell crank 136. The lever 133, if not impeded, is thereby rocked clockwise (Fig. 3), the spring 137 being capable of overcoming the spring 135, and moves the link 131 and lever S forward to the — position so that, during the forward stroke of the next cycle, the crossfooter tumbling frame 57 will be tumbled to the — position. The spring 135 urges the parts to the + position when there is no carriage roll 141 over the arm 140 and the spring 137 and bell crank 136 permit the lever S to be manually held in the + position even when there is a carriage roll 141 holding the arm 140 down.

The engagement and disengagement of the crossfooter pinions 55 or 56 and the actuators 54 are effected by mechanism which is like that shown in the Rinsche Patent No. 1,172,484 and the Pasinski patents, Nos. 1,778,506 and 1,911,768 and is normally conditioned for amount entering operations. The crossfooter main frame 59 pivoted at 60 has a rearwardly extending link 142 pivoted on its left-hand side member below the pivotal support 60. The link 142 has a shoulder adapted to cooperate with a stud 143 on the familiar arm 813 secured on the 800 shaft whereby the frame 59 will be rocked to engage the crossfooter pinions 55 or 56 with the actuators 54 at the end of each cycle of operation of the machine if they should be out of engagement with the actuators at that time. Above and below the pivotal support 60, the left side member of the crossfooter main frame 59 has two studs 144 and 145 adapted to cooperate with notched and shouldered upper and lower branches on the lower forward end of a link 146 pivotally connected at its upper rear end to the middle arm of the familiar three-armed rocking lever 913, the forward and rearward arms of which carry studs 147 and 148, respectively, which are adapted to cooperate with the usual passby pawl 821 carried by the arm 813. At the beginning of each cycle of operation, the pawl 821 engages the stud 147 and rocks the three-armed lever 913 counterclockwise in Fig. 3, thus moving the link 146 forward. In amount entering operations, the forward end of the link 146 is held upward in the position of Fig. 3 by a spring 149 with the stud 144 engaged in the notch in the upper forward branch of said link 146. Thus, when the link 146 is moved forward at the beginning of the cycle, the crossfooter main frame 59 is rocked to disengage the crossfooter pinions from the actuators. Near the end of the forward stroke of the cycle, the passby pawl 821 engages the stud 148 but yields without rocking the lever 913. During the first part of the return stroke, however, the pawl 821 acts on the stud 148 to rock the lever 913 clockwise (Fig. 3) back to its normal position thus drawing the link 146 rearward and rocking the crossfooter frame 59 to engage the crossfooter pinions 55 or 56 with the actuators 54, after which the latter are returned upward to normal from the differential positions corresponding to the depressed amount keys, whereby the amount which was set up on the keys is added or subtracted depending upon whether the pinions 55 or 56 are engaged with the actuators. At the end of the forward stroke, the pawl 821 engages the stud 147 but yields without rocking the lever 813.

The crossfooter may be "non-added." The pawl 821 acting on the stud 147 disengages the crossfooter pinions from the actuators at the beginning of the non-add cycle of the machine just as in an adding or a subtracting amount entering operation. However, when the pawl 821 approaches the stud 148 near the end of the forward stroke, engagement of the pawl 821 with the stud 148 is prevented by a pawl 150 pivoted at 151 and normally held clockwise from its Fig. 3 position so that it normally does not interfere with the action of the pawl 821. The pawl 150 has a stud 152 engaged in the slotted end of a lever 153 which is connected through a link 154 with an arm 155 pivoted at 134 and held by a spring 156 in engagement with a lateral lug on a lever 157 also pivotally supported at 134. The rear end of the lever 157 engages in the slotted end of one arm 158 of a yoke 159 rockably supported on the stud 139 and having a second arm 160 adapted to be acted upon by rolls 161 adjustably mounted on the carriage C. When a carriage roll 161 holds down the arm 160 as shown in Fig. 3, the levers 157 and arm 155 are held in the clockwise position shown in Fig. 3, thus holding the link 154 and arm 153 down and the pawl 150 clockwise in the position shown in Fig. 3 to prevent the pawl 821 from acting on the stud 148. Thus, when the parts are positioned as shown in Fig. 3 by a roll 161 on the carriage, the crossfooter pinions will not be engaged with the actuators 54 at the beginning of the return stroke of the cycle. The crossfooter main frame 59 also has pivotally connected thereto the forward end of a link 162, the rearward end of which is normally held elevated by a spring 163 and has a shoulder adapted to be engaged by a stud 164 on the arm 813 at the end of the forward stroke of the cycle. However, the arm 155 has a finger extending forward over a lateral lug on the forward end of the link 162 so that, when the arm 155 is moved to its Fig. 3 position by a carriage roll 161, the forward shoulder of the link 162 is held out of the path of the stud 164. The parts just described may also be moved to the non-add position illustrated in Fig. 3 manually by the usual "non-add" key (not shown).

For total-taking operations, the connection between the link 146 and the crossfooter main frame 59 is altered. The bell crank 170 of the total key T carries a stud 171 which extends into a slot in a link 172, the lower end of which has a stud and slot connection with the forward end of the link 146 and is also connected to the upper end of the spring 149. Upon depression of the total key, the link 172 is lowered, thereby lowering the forward end of the link 146 to disengage it from stud 144 and to permit engagement of the notch in the lower forward branch of said link 146 over the stud 145. Accordingly, when the link 146 is moved forward at the beginning of the forward stroke of the cycle, the crossfooter main frame 59 will be rocked to engage the pinions 55 or 56 with the actuator racks if they are not already so engaged. At the beginning of the return stroke, the rearward movement of the link 146 disengages the crossfooter pinions from the actuators and at the end of the return stroke the stud 143 engages the shoulder on the link 142 and re-engages the crossfooter pinions with the actuators.

In subtotal-taking operations, the crossfooter pinions are not disengaged from the actuator racks at the beginning of the return stroke of the cycle. The bell crank 175 of the subtotal key ST is connected to a link 176 having a shoulder 177 adapted to engage a stud 178 on the bell crank 179 of the total key T so that depression of the subtotal key ST also rocks the total key bell crank 170 and lowers the link 172 and the forward end of the link 146 as for total taking. The link 176 carries a stud 179 which, upon depression of the subtotal key ST, engages an upwardly extending finger of the pawl 150 and rocks said pawl clockwise from its normal ineffective position to the position of Fig. 3, where said pawl prevents the pawl 821 from acting on stud 148 with the result that the link 146 is not moved rearward to disengage the crossfooter pinions from the actuators at the beginning of the return stroke of the cycle.

The mechanism may also be automatically conditioned for the taking of totals and subtotals from the crossfooter under the control of the carriage, as will be described later.

The illustrated machine is provided with an interlock means like that disclosed in the Pasinski Patent No. 1,778,506 which prevents depression of a total key whenever the position of the crossfooter tumbling frame 57 and the position of the "subtract" lever S do not both correspond to the sign of the total contained in the crossfooter.

Provided that the positions of the crossfooter tumbling frame and the subtract lever coincide and both correspond to the sign of the total contained in the crossfooter, totals and subtotals, both positive and negative, may be taken from said crossfooter without a spacing cycle prior to the total-taking cycle, the illustrated machine being provided for this purpose with mechanism like that disclosed in the Muller Patent No. 1,844,070.

The total key bell crank 170 is connected through a link 190 to an arm 191 secured on the shaft 192 which extends through the machine. Near the right side of the machine, said shaft 192 has secured thereon an arm 193 (Fig. 6) connected to a link 194, the rear end of which is urged upward by a spring 195. The rear end of said link 194 has a shoulder 196 normally in front of a lateral lug on one arm of a latch lever 197 which is urged counterclockwise by a spring 198 and has a second arm having a shoulder 199 normally engaged behind a lateral lug on a lever 200 pivotally mounted at 201 and connected with the rear end of a link 202. As in said Muller Patent 1,844,070, rocking of the total key bell crank 170 a short distance toward total-taking position causes the shaft 192 to be rocked clockwise in Fig. 6 and the link 194 to move rearward and disengage the latch shoulder 199 from the lever 200. A spring 203 connected to the link 202 thereupon pulls said link rearward and rocks the lever 200 counterclockwise. A stud 204 on the lever 200 engages in a slot in the link 194 so that the rocking of lever 200 by the spring 203 completes the movement of the total key bell crank 170 to total-taking position. The link 202 is connected at its forward end with the lower arm of a member 205 secured on a shaft 206. As in said Muller Patent 1,844,070, the counterclockwise rocking of said member 205 and shaft 206 by rearward movement of the link 202 results in the crossfooter being disengaged from the actuators, the restoring to normal of any actuators which are out of their normal "0" positions in consequence of tens transfers effected during the preceding cycle of operation, and the rocking of a bail 207 (Fig. 3) which releases the transfer pawl latches and permits any transfer pawls moved in tens-transfer operations during the preceding cycle to return to normal. The link 202 also carries a stud 210 (Fig. 6) which, when the link moves rearward, engages one arm of a bell crank 211, the other arm of which is connected through a stud and slot connection 212 to a spring 213 which, in turn, is secured to a connecting piece 214. As shown in Fig. 2, the connecting piece 214 has an apertured lug through which the control link 33 passes and which is clamped between two nuts threaded on the lower end of the link 33 below the clutch arm 35 so that, when said connecting piece 214 is drawn upward, it not only rocks the arm 35 to cause engagement of the clutch and closing of the motor switch, but it also lifts the clutch control link 33 and thereby causes depression of the main motor bar M. As the lever 200 is rocked counterclockwise (Fig. 6) by the spring 203, the stud 204 not only pulls the link 194 rearward but also depresses its rearward end and lowers the shoulder 196 below the lateral lug on the latch member 197 so as to permit the shoulder 199 on said latch member to re-engage behind the lateral lug on the lever 200 when it is restored to normal during the ensuing cycle. The restoring of the lever 200 during said cycle is effected by a stud 215 on the arm 46 engaging the lower arm of a lever 216 pivoted at 217 and having in its upper arm a slot in which engages a stud 218 on said lever 200.

Thus, the rocking of the total key bell crank 170 while it is free, i. e., while the position of the "subtract" lever S and the position of the crossfooter tumbling frame 57 correspond to the sign of the total in the crossfooter, not only effects the operation necessary to condition the machine for a total-taking or subtotal-taking cycle but also initiates the machine cycle for taking the total or subtotal.

If the position of the crossfooter tumbling frame and the position of the subtract lever S do not coincide with each other as well as correspond to the sign of the total in the crossfooter when the paper carriage occupies a columnar position where a total or a subtotal should be taken from the crossfooter, it will sometimes be necessary to give the machine a spacing cycle of operation for tumbling the crossfooter to the position corresponding to the sign of the total before the total key or subtotal key can be depressed. In such a case, the carriage should remain in the same columnar position until the total or subtotal is taken. With the illustrated machine set up for the example of work shown in Fig. 21 and presently to be described, it will sometimes occur that a negative total is contained in the crossfooter when the carriage arrives in the column 5 position where a crossfooter subtotal is to be taken and printed whereas the "subtract" lever S and the crossfooter would normally be in the + position at that time so the operator may be required to move the lever S to the — position and give the machine a spacing cycle to tumble the crossfooter to the — position. The machine is provided with a means like that illustrated in Figs. 1, 10 and 11 of the Muller Patent No. 2,202,596 which automatically disables the tabulating mechanism when the carriage reaches a predetermined columnar position, the column 5 position for the example of work shown in Fig. 21, and keeps it disabled until the total key or subtotal key is depressed so that the carriage will not tabulate to the next columnar position until the total or subtotal is taken. This mechanism includes the lever 220 (Fig. 11) which, whenever the forward end of the total key bell crank 170 is depressed, is rocked counterclockwise by the stud 221 on the link 222 connected at its forward end to the downward arm of the total key bell crank 170. When the lever 220 is thus rocked counterclockwise, it depresses the horizontal arm 223 of a bell crank corresponding to that numbered 146 in the Muller Patent No. 2,202,596. For the example of work illustrated in Fig. 21, the column stop 72 for the column 5 position of the carriage is slotted as indicated at 76 in Fig. 11 in the manner of the column stop 122' of said Muller patent.

The machine also has an upper motor bar U (Figs. 1 and 4), the upper end of the stem 230 of which is guided on a fixed stud 231 (Fig. 4) projecting through a slot in said stem. The lower end of the stem is pivotally connected to an arm 232 (Fig. 1) pivotally mounted at 233. The motor bar U is urged to its upper normal position by a spring 234 (Fig. 4) but, when the upper motor bar U is depressed, it also causes depression of the regular motor bar M. For this purpose, a bell crank 235 pivotally mounted at 236 on the stem 230 has a forward arm with a slotted end receiving a stud 237 on the rearward end of the lever 28 on which the rear end of the regular motor bar M is supported. A stud 238 is secured in the stem 230 immediately above the forward arm of the bell crank 235 so that, when the upper motor bar U is depressed, the stud 238 limits clockwise rotation of crank 235 and so causes clockwise rocking of lever 28, counterclockwise rocking of lever 27, depression of the regular motor bar M and elevation of the motor control link 33 to initiate a machine cycle.

When the regular motor bar M is depressed, the usual "repeat hook" 240 (Figs. 1, 4, 6, 8 and 9) pivoted on the lever 28 hooks under a stud 241 (Fig. 4) secured on the lever 27 and so holds the regular motor bar depressed until the "repeat hook" is operated as described later to release the stud 241. While the regular motor bar M is held depressed after depression resulting from depression of the upper motor bar U, the latter is prevented from rising to its normal position and is held in an intermediate or partially depressed position. The bell crank 235 is so arranged and dimensioned in relation to the cooperating parts that, when the upper motor bar U is depressed, the downward arm of the crank swings slightly forward of the stud 231. When manual pressure is withdrawn from the upper motor bar U, the spring 234 moves it upward a short distance but, as the regular motor bar M is latched in depressed position, the stud 237 causes the crank 235 to rock counterclockwise until its downward arm engages against the side of the squared portion of stud 231 to prevent further upward movement of the upper motor bar U which is thus latched in an intermediate position until the regular motor bar M is unlatched and returned to normal.

When the regular motor bar M is manually depressed, the stud 237 rocks the crank 235 counterclockwise to place the end of the downward arm of the crank over the squared portion of the stud 231 which then prevents depression of the upper motor bar U while the regular motor bar M remains depressed.

The machine is also provided with mechanisms as disclosed in the Muller Patent No. 2,274,803, but modified in certain respects, for controlling skip tabulation of the paper carriage, automatic cycling of the machine under certain conditions when the carriage reaches a predetermined columnar position, and automatic carriage control of total taking. However, before proceeding further with the detailed description of the illustrated mechanisms, an example of work which the machine is adapted to perform will first be explained to facilitate understanding of the mechanisms described later.

Example of work

Fig. 21 illustrates a statement form such as prepared in a bank in connection with a customer's checking account. Columns 6 and 7 of the illustrated form are on a portion which can be detached from the remainder of the form along the line of perforations between columns 5 and 6. Columns 1, 2 and 3 are the usual old balance pickup and checks columns. Column 4 is the deposit column and column 5 the balance column. Column 6 of the detachable portion is also a balance column and column 7 is the analysis column. Of course, any desired kind of analysis data could be entered in the analysis column 7, but, merely for the sake of an illustration, the figures which have been entered in column 7 of Fig. 21 represent the amounts of deposited checks which have been entered to the customer's credit but not immediately collected.

In making the entries in line I of the statement form of Fig. 21, the old balance of 100.00 is set up on the keyboard of the machine with the paper carriage in the column 1 position. The machine is set into operation by depression of the regular motor bar M, whereupon the old balance of 100.00 is added in the crossfooter. After the printing mechanism has operated to print 100.00, the carriage tabulates to the column 2 position where it automatically sets the crossfooter controls for subtraction. The operator sets up 25.00, the amount of a check, on the keyboard and again depresses the regular motor bar M, whereupon the machine operates to print the amount 25.00 in column 2 and subtracts this amount from the crossfooter. After the printing operation in column 2, the carriage tabulates to the column 3 position where the amount of another check, 30.00, is entered and printed in column 3 and subtracted from the crossfooter in a cycle of operation also initiated by depression of the regular motor bar. The carriage then tabulates to the column 4 position where it automatically conditions the crossfooter controls for addition. The operator then sets up 75.00, the total of a number of deposit items, and depresses the regular motor bar M to give the machine a cycle of operation during which the amount 75.00 is added in the crossfooter and printed in column 4, whereupon the carriage tabulates to the column 5 position and the machine is automatically given a cycle of operation during which a subtotal is taken from the crossfooter and printed in column 5, leaving the total still in the crossfooter. The carriage then tabulates to the column 6 position, whereupon the machine is given another automatic cycle of operation during which the total is taken from the crossfooter, leaving the latter clear, and printed in column 6. Then the carriage tabulates to the column 7 position where the operator enters the amount 50.00 on the keyboard and depresses the regular motor bar to give the machine a cycle of operation during which the amount 50.00 is printed in column 7 and the carriage return mechanism is set into operation to return the carriage to the column 1 position.

In making the next line of entries, line II on the form of Fig. 21, the operator reads the balance, 120.00, from column 5 or 6 in line I, sets this up on the keyboard and depresses the regular motor bar M to give the machine a cycle of operation for adding this amount in the crossfooter and printing it in column 1, after which the carriage tabulates to the column 2 position. Here, the operator sets up 40.00, the amount of a check, on the keyboard and, noting that there is no further check to be posted, the operator depresses the upper motor bar U. Also noting that there is a deposit to be entered in column 4, the operator depresses said motor bar U in a particular way, causing an operation of the machine for subtracting the amount of the check from the crossfooter and printing the amount in column 2, after which the carriage skip tabulates to column 4 and the machine comes to rest. Here, the operator sets up the amount of 20.00 on the keyboard and, noting that this deposit does not require the entry of any analysis figures in column 7, the operator again depresses the upper motor bar U which causes a machine cycle in which the amount of the deposit is added in the crossfooter and printed in column 4, after which the carriage tabulates to column 5. When the carriage reaches the column 5 position, the machine is automatically cycled to take and print the crossfooter subtotal, after which the carriage tabulates to column 6, where the machine is automatically cycled to take the automatic total and print it so that the new balance is printed in columns 5 and 6 in line II. As a result of the depression of the special motor bar for the column 4 entry in line II, the carriage return mechanism is set into operation after the printing of the total in column 6 and the carriage is returned to the column 1 position without entering the column 7 position. This saves the time which would ordinarily be required by tabulation of the carriage into the column 7 position and by manual depression of a motor bar by the operator after the carriage reached the column 7 position. It is also noted that the depression of the upper motor bar U which causes the carriage to be returned from the column 6 position instead of tabulating into the column 7 position is effected by the operator at the time of initiating the machine cycle for the entry in column 4. The presence or absence of analysis data to be entered in column 7 is determined by the nature of the item entry in column 4 and at the time of making the column 4 entry the operator has in mind the fact that analysis data are or are not to be entered in column 7. In line I, the operator, at the time of setting up the amount of the deposit, 75.00, on the keyboard for the entry in column 4, noted that some of the items included in the deposit required analysis data to be entered in column 7 and, therefore, depressed the regular motor bar M for the entry in column 4. The operator can utilize the time during which the machine performs the two automatic cycles for printing the balance in columns 5 and 6 to determine the exact figures to be entered in column 7. At the time of setting up the amount of 20.00 on the keyboard for entry in column 4 in line II, the operator, noting that no analysis data were to be entered in column 7 in line II, depressed the upper motor bar U and could then immediately dismiss from mind any question regarding column 7. The operator did not have to wait until after the total was printed in column 6 to do anything further to cause the carriage return to column 1. Instead, the operator could utilize the time during which the machine was performing the automatic cycles for the printing of the balances in columns 5 and 6 in making ready for the next posting operation to be performed.

In line III, the old balance of 80.00 is entered in the pickup column 1 in the usual way. In entering 15.00, the amount of a check, in column 2, the operator, noting that there is no further check to be entered and that there is no deposit to be entered in column 4 in line III, depresses the upper motor bar U and withdraws manual pressure from said motor bar immediately after having depressed it. After the printing of the amount of 15.00 in column 2, the carriage skips to the column 4 position and the machine is immediately automatically given a cycle of operation during which the crossfooter is tumbled to adding position so that, when the carriage tabulates to column 5, the "add" pinions 55 of the crossfooter are positioned for engagement with the actuators 54 for the automatic subtotal-taking operation during which the balance is printed in column 5. After the printing of the balance in column 5, the carriage tabulates to the column 6 position where the total is taken from the crossfooter and printed, after which the carriage is returned directly to the column 1 position without tabulating into the column 7 position. In the making of this third line of entries, the upper motor bar U was depressed while the carriage was in the column 2 position and remained depressed until near the end of the automatic cycle while the paper carriage was in the column 4 position. The upper motor bar U, being in depressed position during the cycle with the carriage in the column 4 position, caused the carriage return mechanism to be conditioned to return the carriage from the column 6 position to the column 1 position. This was correct because, there being no deposit to be entered in column 4, there would, in the example of work being described for the purpose of illustration, be no analysis data to be entered in column 7.

It should be noted at this point that the carriage is not necessarily returned to the column 1 position from the column 6 position at the end of a line of entries in which no entry is made in column 4. Suppose, for the sake of illustration, that the analysis data to be entered in column 7 might sometimes be based upon entries made in some other column besides column 4. For example, suppose that, in accordance with the system being used in a particular business, the nature of the debit item in column 2 of line III was such as to necessitate the entry of data in column 7 even though there was no item to be entered in column 4. In that case, the operator, in initiating a machine cycle for the entry in column 2, would depress the upper motor bar U to cause the carriage to skip tabulate to the column 4 position but would maintain manual pressure on the motor bar until the carriage comes to rest in column 4. Then the machine would not perform an automatic cycle when the carriage reaches the column 4 position but the operator could then release the upper motor bar U and immediately depress the regular motor bar M to cause the needed cycle of operation in column 4 for tumbling the crossfooter to adding position, after which the balance would be printed in columns 5 and 6 during automatic cycles of the machine and the paper carriage would tabulate into the column 7 position after the printing of the total in column 6.

In line IV on the work sheet shown in Fig. 21, there are no checks or debit items to be entered in columns 2 and 3. Noting this at the time of setting up the amount of the old balance, 65.00, on the keyboard for the column 1 entry, the operator depresses the upper motor bar U and continues to hold it fully depressed. After the printing of the amount of 65.00 in column 1, the carriage skip tabulates to the column 4 position. No automatic cycle is performed by the machine at this time because the upper motor bar is held fully depressed until the carriage reaches the column 4 position. The operator then releases the upper motor bar, sets up the amount of the deposit, 50.00, on the keyboard, and depresses the regular motor bar M to initiate the deposit entering cycle of the machine in view of the fact that the nature of some of the deposit items included in the 50.00 amount is such as to require the entry of analysis data in column 7.

The amounts entered in the several columns on the work form in Fig. 21 may be added into different ones of the multiple registers 42 or the multiple registers may be "non-added" in selected columns. Fig. 21 indicates that a roll $161^x$ is placed on the carriage to "non-add" the crossfooter when the carriage is in the column 7 position.

The foregoing description of one example of work is not to be considered as limiting the scope of the invention in any way. One example of work has been described merely to facilitate an understanding of the following detailed description of the mechanisms involved, and it will become clear from the following description of the mechanisms that the invention is equally well adapted for use in the performance of other varieties of work, many of which may involve different sequences of operations of the manual and automatic controls of the machine.

*Carriage skip tabulation*

The carriage tabulating mechanism which normally causes the carriage to tabulate to the next columnar position during the latter part of each machine cycle has already been briefly described. When there are no entries to be made in certain columns on the work form, as in column 2 in lines II and III and in columns 2 and 3 of line IV of the work form shown in Fig. 21, it is desirable to have the carriage skip past these columns. This result is obtained under control by the upper motor bar U. A stud 255 (Fig. 1) carried by a member secured on the stem 230 of the upper motor bar U underlies the rearward arm of a pawl 257 which is pivoted on an arm 258 secured to a shaft 259. When the upper motor bar U is in its normal upper position, the stud 255 holds the pawl 257 in the position of Fig. 1 where the upper end of the front arm of the pawl is positioned forwardly of a stud 260 carried by the rear arm 261 of a three-armed lever 262 (Figs. 1 and 6) pivotally mounted at 263 and urged counterclockwise by a spring 264. The lower arm 265 of the three-armed lever has a cam end in the path of a stud 266 secured on the full-stroke sector 49. Near the end of the forward stroke of each machine cycle, the stud 266 engages the cam end of the arm 265 and rocks the three-armed lever 262 clockwise from the position of Fig. 1. When the upper motor bar U is depressed, the stud 255 is lowered and the pawl 257 is rocked clockwise by a spring 256. A stud 267 on the arm 258 engages in a wide notch in the rear arm of the pawl 257 and limits the clockwise rotation of the pawl by the spring 256 to a position where the forward end of the pawl is under the stud 260. The arrangement and dimensions of the parts are such that, even if the operator immediately removes manual pressure from the upper motor bar U after depressing it and permits the latter to return to its intermediate position where it is held by the engagement of the crank 235 against the stud 231, the stud 255 still permits the pawl 257 to position the end of its forward arm under the stud 260. Thus, in each machine cycle initiated by depression of the upper motor bar U, the stud 260 engages the pawl 257 and rocks the arm 258 and shaft 259 counterclockwise (Fig. 1). An arm 270 (Fig. 11) is also secured to the shaft 259 and is pivotally connected to a link 271 which is, in turn, pivotally connected to an arm 272 pivotally mounted at 273 and carrying a stud 274 engaging in a cam slot in one arm 275 of yoke 276 pivotally mounted on a shaft 277. A second arm 278 of said yoke has a stud 279 engaging in a slot in a link 280 connected to a slide 281 slidably mounted on studs on the fixed supporting member 87 (Fig. 19). The slide 281 carries a roller 282 underlying a bail 283 pivotally mounted at 284 at both ends on the carriage. At its right-hand end, viewing the machine from the front, or at the left-hand end in Fig. 18, the bail 283 has a depending arm 285 adapted to cooperate with an arm 286 secured to the "tab stop" shaft 72. It will be seen that, when the shaft 259 is rocked counterclockwise in Fig. 1 and clockwise in Fig. 11 during a cycle of operation initiated by depression of the upper motor bar U, the slide 281 and roller 282 will be drawn downward to permit the bail 283 and arm 285 to be rocked counterclockwise in Fig. 11 by a spring 287. When so moved downward, the slide 281 is latched in its lowered position by a spring-urged latch member 288 (Figs. 11 and 19). At the time the slide 281 is lowered, the counterclockwise movement of the bail 283 is stopped by engagement of the arm 285 against the end of the arm 286. It will be recalled that, when the tabulating mechanism is operated after the printing operation during a cycle of operation of the machine, the tabulating pawl 75 (Fig. 18) engages the active column stop 73 and rocks it and the shaft 72 counterclockwise in Fig. 11. This lowers the end of the arm 286 below the end of the arm 285 and permits the latter to move over the arm 286 to latch the shaft 72 in its rocked position with the forward ends of all of the column stops 73 above the level of the abutment 75. This permits the carriage to move in the tabulating direction without being arrested by any of the column stops 73 as long as the shaft 72 remains latched in its rocked position. A release member 289 (Fig. 11) is adjustably mounted on the bail 283 in such a position as to trip the latch member 288 and release the slide 281 for restoration to normal by its spring 290 (Fig. 19) as the carriage approaches the columnar position where it is desired to stop it after its skip-tabulating movement. As the slide 281 and roller 282 return to normal, the latter returns the bail 283 and arm 285 to the normal position of Fig. 11 which releases the arm 286 and permits the shaft 72 and column stops 73 to be returned to normal position by the usual spring so that the stop 73 for the desired columnar position is positioned to engage the abutment 74 and arrest the carriage. Thus, as a result of an operation of the machine initiated by depression of the upper motor bar with the carriage in any one of a plurality of columnar positions, such as columns 1, 2 and 3 in the example of work shown in Fig. 21, the carriage is released for a skip-tabulating movement which is stopped in a predetermined subsequent columnar position of the carriage, such as column 4 in the example of Fig. 21, determined by the position of a skip-release member 289 on the bail 283.

In the example of work illustrated in Fig. 21, it is not desired that the carriage should skip tabulate past the column 5 position from the column 4 position although, in some circumstances, as explained in the illustrated example of work, the upper motor bar U is depressed for initiating the cycle of operation when the carriage is in the column 4 position. To prevent such an undesirable skipping of column 5, another skip-release member 289 is positioned on the bail 283 so as to release the skip latch 288 as the carriage moves out of the column 4 position and prior to the time it reaches the column 5 position so that the carriage can be arrested by the stop 73 for column 5.

Control of automatic machine cycles

The automatic cycle of the machine under certain circumstances when the carriage reaches the column 4 position in the example of work illustrated in Fig. 21 is controlled by the upper motor bar U in such a manner that, when the operator depresses the upper motor bar with the carriage in the first, second or third columnar position and immediately withdraws manual pressure from said motor bar, the machine is automatically given a cycle of operation when the carriage reaches the column 4 position but, when the operator depresses the upper motor bar U with the paper carriage in the first, second or third columnar position and continues to hold said motor bar fully depressed until the end of the forward stroke of the cycle, the machine is not given an automatic cycle of operation when the carriage reaches the column 4 position.

It will be recalled that, when the operator withdraws manual pressure from the upper motor bar U immediately after having depressed it, said motor bar is raised part way toward its normal undepressed position to an intermediate position where it is held by the crank 235 and stud 231 in cooperation with the repeat hook 240 and stud 241. The stem 230 of the upper motor bar U is formed with a cam finger 300 (Fig. 4) cooperating with a stud 301 carried by a member 302 pivotally supported on a shaft 303 and urged clockwise by a spring 304 (Fig. 6). The lower rearwardly extending end of the member 302 has a notch 305 located between rearward and forward shoulders 306 and 307 and cooperates with a stud 308 carried by the rearward arm 309 of the usual three-armed lever 310 pivotally mounted at 311. The arm 309 also carries two passby pawls 315 and 316, the latter being slightly shorter than the former. Both pawls are urged toward the position of pawl 316 in Fig. 4 relative to the arm 309 by springs 317 which also urge three-armed lever 310 clockwise. The downward arm 312 of the three-armed lever 310 cooperates with the full-stroke sector 49 which, while the machine is at rest, holds the three-armed lever 310 in a position where the ends of both of the pawls 315 and 316 are above a roller 318 carried by a lever 319 mounted on a shaft 320. The lever 319 is one of the side arms of the usual key release bail 325 carried by said lever and another lever forming the opposite side arm of the bail at the other side of the machine. The lever 319 has a portion extending above the cross member 325 and adapted to cooperate with the end of the slide 326 carried on the lower plate of the keyboard. The slide 326 has a projection 327 cooperating with the upper end of the repeat hook 240.

The cam finger 300 of the upper motor bar stem 230, the stud 301 and the member 302 are so arranged and dimensioned that, when the upper motor bar U is in its normal position, the lower cam edge of the finger 300 holds the member 302 in a position where the notch 305 is in the path of the stud 308. Thus, in a cycle of operation initiated, for example, by depressing the regular motor bar M, and while the upper motor bar U is in its normal upper position, the counterclockwise movement of the full-stroke sector during the forward stroke of the cycle of operation will permit the three-armed lever 310 to be rocked clockwise by the springs 317 until the stud 308 reaches the bottom of the notch 305 in the member 302. This movement of the arm 309 is sufficient to carry the ends of both of the passby pawls 315 and 316 past the roller 318 with the result that, during the return stroke of the cycle of operation, the longer pawl 315 will act on the roller 318 to cam the lever 319 counterclockwise sufficiently far not only to cause the bail 325 to release any depressed amount keys but also to cause the upper end of the lever 319 to move the slide 326 forward sufficiently to cause the projection 327 to release the repeat hook 240 from the stud 241 and permit the regular motor bar M to return to normal position provided that the operator is not holding it down. However, a holding down of the regular motor bar M past the end of a cycle will not cause a further cycle of operation of the machine.

During the forward stroke of each machine cycle, the roller stud 266 on the full-stroke sector 49 engages the end of an upwardly extending projection 330 (Fig. 4) of the motor control link 33 and depresses the latter somewhat below its normal position to move the stud 331 carried by the link 33 below the end of a latch pawl 332 pivoted on the fixed stud 333 and urged clockwise in Fig. 4 by a spring (not shown). While the regular motor bar M is in its normal position, the stud 241 cooperating with a downwardly and forwardly extending finger 335 of the pawl 332 holds the latter in a position counterclockwise of the Fig. 4 position with the lower end of the pawl rearward of the stud 331. However, when the regular motor bar is in its depressed position and the link 33 is depressed by the roller stud 266, the above-mentioned spring tends to move the lower end of the pawl 332 forward above the stud 331 as shown in Fig. 4 where the finger 335 limits against the stud 241 so that, when the roller stud 266 returns to normal position during the return stroke of the cycle, the pawl 332 and stud 331 prevent the link 33 from moving upward above its normal position.

If the release of the repeat hook 240 is prevented during a machine cycle and the lower end of the pawl 332 is moved rearward of the stud 331 at the proper time as described later, the motor bar M will remain latched down at the end of said cycle and the spring 34 will raise the link 33 to initiate a further cycle automatically. For the present, however, assume that a cycle has been initiated by direct manual depression of the regular motor bar M and that it is not desired that said cycle be followed by an automatically initiated cycle. If the operator, during the cycle initiated by direct manual depression of the regular motor bar M, withdraws manual pressure from said bar at any time prior to or including the time the slide 326 is operated to release the repeat hook 240, the motor bar will be returned to normal by its spring 31 when the repeat hook 240 is released and the stud 32 on the lever 27 will move down into the lower end of the slot in the link 33 while the stud 241 will act on the finger 335 to position the lower end of the pawl 332 rearward of the stud 331 so that the link 33 will not be held down by the pawl 332 if the operator again depresses a motor bar to manually initiate a further cycle of operation. If, however, the operator should hold the motor bar M down beyond the time when the repeat hook 240 is operated by the lug 327 on the slide 326, the lower end of pawl 332 will be above the stud 331 to prevent the link 33 from rising but the repeat hook 240 should be prevented from re-engaging under the stud 241. For this purpose, a detent pawl 336 pivoted on the fixed stud 30 and urged counterclockwise in Fig. 4 by a spring 337 has an upper rearwardly extending finger with a shoulder adapted to engage in front of a stud 338 on the repeat hook 240 when the slide 326 operates to disengage the repeat hook from the stud 241. The repeat hook is thereby prevented from re-engaging the stud 241 while the operator continues to hold the motor bar depressed but, when the operator permits the motor bar to return to normal, the stud 241 moves down against a lower rearwardly extending finger 339 of the detent 336 and depresses its shoulder from in front of the stud 338 to permit the repeat hook 240 to re-engage the stud 241 upon a subsequent depression of the motor bar.

Figures 4, 5:
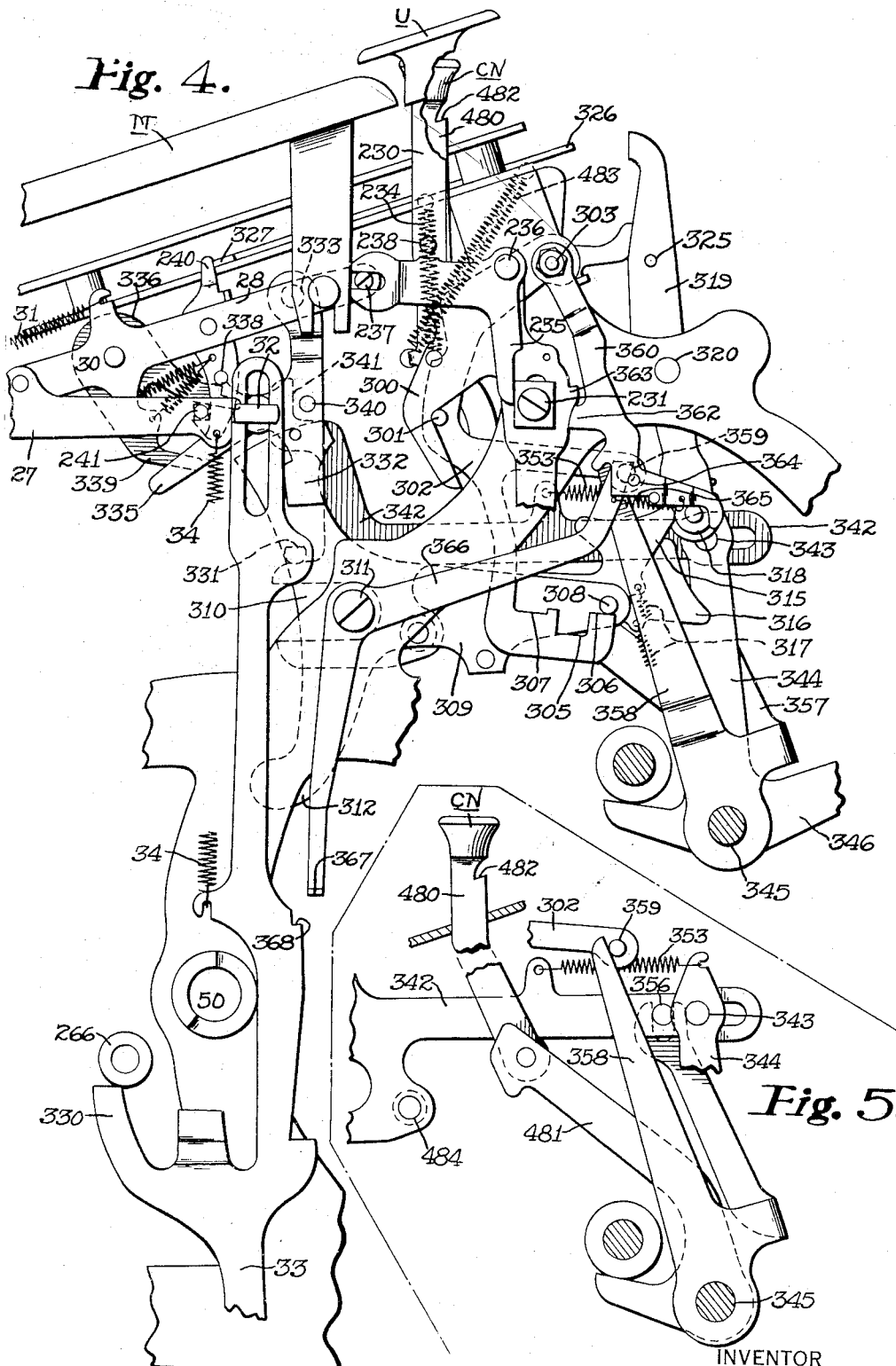
Fig. 4 is a right side view on a large scale of certain parts at the rear of the right side of the machine.
Fig. 5 is a detail illustration of the "cycle normal" key and certain parts controlled thereby, some of which can be seen also in Fig. 4.

When the operator depresses the upper motor bar U and withdraws manual pressure from it to permit it to return to its intermediate position before the beginning of the return stroke of the cycle, the cam finger 300 and stud 301 permit the member 302 to occupy the position of Fig. 4 where the shoulder 306 is in the path of the stud 308. The shoulder 306 engages the stud 308 during the forward stroke of the cycle so that the end of the shorter passby pawl 316 has passed the end of the roller 318 but the roller still holds the longer pawl 315 in the position shown in Fig. 4. During the return stroke of this cycle, only the shorter pawl 316 acts on the roller 318 with the result that the lever 319 and bail 325 are rocked counterclockwise only sufficiently to release depressed amount keys but not sufficiently to cause the projection 327 on the slide 326 to release the repeat hook 240. Consequently, the regular motor bar M and also the upper motor bar U remain latched down at the end of this cycle.

The pawl 332 has a stud 340 cooperating with an upwardly extending finger 341 at the forward end of a repeat slide 342 slidably mounted on the stud 311 and having at its rear end a slot receiving a stud 343 on one arm 344 of a bell crank pivoted on the shaft 345. A second arm 346 of said bell crank has suitable connections, such as disclosed in the Muller Patent No. 1,397,774, with an arm 347 (Fig. 18) of a yoke member 348 pivoted on a fixed stud 349 and having a second arm 350 carrying a pass-by pawl 351 cooperating with repeat control rolls on the carriage to operate the slide 342. The arm 344 is urged to its normal position of Fig. 4 by a spring 352 (Fig. 6) connected to its upper end which is also connected to one end of a spring 353, the other end of which (Fig. 4) is connected to the repeat slide 342 to urge it to keep the forward edge of the slot in its rear end engaged with the stud 343. When the stud 343 is engaged with the front edge of the slot in the slide 342, it also urges the arm 344 counterclockwise because it is connected with said arm at a point appreciably above the stud 343.

It has already been explained that the carriage always tabulates to a predetermined columnar position, the column 4 position in the example of work illustrated in Fig. 21, as an incident to every machine cycle initiated by a depression of the upper motor bar U when the carriage is in a preceding columnar position, such as the column 1, 2 or 3 position in the example of Fig. 21, skipping any intermediate columnar position or positions. The carriage has a small repeat control roll 355 adjustably mounted thereon in such a position that, as the carriage reaches the above-mentioned predetermined columnar position (the column 4 position in the example of Fig. 21), said roll 355 engages the pawl 351 and depresses the arm 350 to move the repeat slide 342 rearward sufficiently to cause the finger 341 to engage the stud 340 and move the lower end of the pawl 332 rearward from above the stud 331. If the motor bars have remained latched as described above, and the link 33 is not otherwise impeded, the spring 34 will now raise the link 33 rapidly to initiate an automatic further cycle of operation of the machine. Thus, when the upper motor bar U is depressed while the carriage is in certain columnar positions and pressure is immediately withdrawn, the carriage will, as an incident to the cycle thus initiated, move to a predetermined columnar position and, thereupon, the machine will automatically be given a further cycle of operation.

The slide 342 has a stud 356 (Figs. 4 and 5) engaged in the upper forked end of one arm 357 of a lever pivotally supported on the shaft 345 and having a second arm 358 engaging in front of a stud 359 on a rearward arm of the member 302. While the carriage is in the predetermined columnar position where the slide 342 is positioned by the small repeat roll 355, the column 4 position of Fig. 21, the lever 357—358 acting on the stud 359 holds the member 302 in a position such that the notch 305 is in the path of the stud 308. Consequently, both pawls 315 and 316 will pass below the roller 318 during the forward stroke of the machine cycle performed while the carriage is in the columnar position where the roll 355 is effective, and, during the return stroke of said cycle, the long pawl 315 will act on the roller 318 to operate the lever 319, slide 326 and repeat hook 240 to release the motor bars. Thus, the motor bars of the illustrated machine, set up for the example of work illustrated in Fig. 21, are always released at the end of the cycle performed while the carriage is in the column 4 position.

The upper motor bar U may be used to secure the same control of the carriage movement without causing an automatic cycle of the machine following the cycle initiated by depression of said upper motor bar. When the upper motor bar U is depressed and manually held fully depressed, the upper rear cam surface of the finger 300 acts on the stud 301 to hold the member 300 in the same position which it occupies while the upper motor bar U is in its normally raised position, that is, with the notch 305 in the path of the stud 308. If the upper motor bar is held thus fully depressed until the end of the forward stroke of the cycle, i. e., until the stud 308 has entered the notch 305, the repeat hook 240 is released during the return stroke of the cycle initiated by such a depression and manual holding down of the upper motor bar U. It results from the foregoing that, if the operator withdraws pressure from the upper motor bar after the stud 308 has entered the notch 305 and before the carriage roll 355 moves the repeat slide 342 rearward to move the pawl 332 away from the stud 331, the motor bars M and U will return to normal and the machine will stop at the end of the cycle thus manually initiated.

The machine is also provided with means which prevent an automatic cycle when the operator holds the upper motor bar fully depressed until the carriage roll 355 moves the pawl 332 rearward of the stud 331. A lever 360 pivoted on the shaft 303 and urged clockwise (Fig. 4) by a spring 361 (Fig. 1) has a cam 362 adapted to cooperate with a cam 363 on the rear edge of the stem 230 of the upper motor bar U. A spring 365 connected at one end to the lower rear end of the lever 360 and at the other end to the upper arm of a bell crank 366 pivoted at 311 urges the said arm against a stud 364 on the lever 360. When the upper motor bar U is depressed below the previously described intermediate position the cams 363 and 362 cause the lever 360 to be rocked counterclockwise from its Fig. 4 position and the spring 365 rocks the bell crank 366 clockwise to press a lateral lug 367 on the lower arm of said bell crank against the rear edge of the motor control link 33. During the ensuing cycle, when the link 33 is lowered to its Fig. 4 position by the stud 266 on the full-stroke sector 49, a shoulder 368 on the link 33 passes below the lug 367 which is then moved over said shoulder by the spring 365. As long as the upper motor bar U is thus held depressed below said intermediate position, the lug 367 prevents the link 33 from rising to initiate an automatic cycle. When the operator releases the upper motor bar, the repeat hook 240 having been released from the stud 241, both motor bars U and M will rise, the lever 360 will move clockwise and the stud 364 will rock the bell crank 366 to move the lug 367 rearward from the shoulder 368 but the stud 32 will then move downward to the lower end of the slot in the link 33 and an automatic cycle will not be initiated.

The motor control link 33 is also controlled as disclosed in the Muller Patent No. 2,012,317 to prevent a cycle of machine operation from being initiated either manually or automatically while the carriage is not in any columnar position and, therefore, may be moving between columnar positions. As disclosed in said Muller patent, when the active column stop 73 is moved by the tabulating pawl 75 or in any other manner out of engagement with the abutment 74, the latter moves to the left as viewed from the rear of the machine in Fig. 18. The next column stop 73 to cooperate with the abutment to hold the carriage in a columnar position returns the abutment 74 in the opposite direction to its normal position, such movement being controlled by a dash-pot (not shown) to cushion the arrest of the carriage The abutment is also connected in the manner disclosed in said Muller patent to a bell crank 370 (Fig. 6) corresponding to the bell crank 101 of Fig. 13 of said Muller Patent No. 2,012,317 and having one arm overlying the rearward arm of a bell crank 371 pivoted at 372 and urged counterclockwise in Fig. 6 by a spring 373. The other arm of the bell crank 371 is connected through a link 374 to the lower end of a latch lever 375 pivoted intermediate its ends on a fixed pivot 376. The upper end of the lever 375 has a lateral lug 377 adapted to cooperate with a shoulder 378 on the rear edge of the link 33. When the active column stop 73 disengages from the abutment 74 and the latter moves to the left in Fig. 18, the spring 373 moves the lug 377 forward above the shoulder 378 and prevents the link 33 from rising to initiate a machine cycle. When another column stop 73 engages the abutment 74 and returns it to the right in Fig. 18 in cushioning the arrest of the carriage, the lug 377 is retracted rearward from the shoulder 378 to release the link 33 for upward movement if it is not otherwise impeded at that time.

Automatic total taking and subtotal taking control means

The illustrated machine is provided with mechanism which, the machine being set up for the example of work illustrated in Fig. 21, causes the machine to perform an automatic subtotal-taking operation under certain conditions when the carriage reaches the column 5 position and to perform an automatic total-taking operation when the carriage reaches the column 6 position. For convenience, this mechanism will be referred to briefly as the automatic total mechanism.

A large repeat roll 380 is adjustably mounted on the carriage so that, as the carriage comes to rest in the column 5 position, said roll 380 depresses the repeat lever 350 and moves the slide 342 rearward to such an extent that the upstanding finger 341 on the forward end of the slide 342 engages a lateral projection 381 (Fig. 8) on one side arm of a latch yoke 382 pivoted on the stationary stud 333 and urged clockwise to the position of Fig. 1 by a spring 383 (Fig. 8). The second arm of the latch yoke has a hooked end 384 normally engaged under a lateral lug on the rear end of a lever 385 pivotally mounted on a stud 386 and urged clockwise by a spring 387. The large roll 380 depresses the repeat lever 350 and moves the slide 342 rearward to such an extent that the finger 341 engages the lateral lug 381 on the latch yoke and moves the latter counterclockwise to withdraw the hook 384 from beneath the lateral lug on the lever 385 which is thereupon moved clockwise about its pivot 386 by its spring 387 and strikes a lateral lug on the rear end of a latch lever 390 also pivoted on the stud 386 and urged counterclockwise by a spring 389. The latch lever 390 has a shoulder 391 on its forward arm normally engaged behind a lateral lug on one arm 392 of a lever 393 pivotally mounted on the shaft 192. The lever 385 rocks the latch lever 390 clockwise, raising its shoulder 391 above the lug on the arm 392 whereupon the lever 393 is rocked clockwise by a strong spring 395 (Fig. 6) connected at one end to the lower arm of the lever 393 and at its other end to the lower arm of a lever 396 pivotally mounted at 397 and having an upper arm having a lateral lug 398 normally engaged behind the hooked end 399 of one arm of a latch lever 400 pivoted at 401 and urged counterclockwise by a spring 402.

The spring 395 is limited by a telescoping sleeve 411 and rod 412 located within the spring 395 and connected to the levers 393 and 396 respectively.

When the lever 393 is rocked clockwise by the spring 395, an arm 403 of said lever 393 engages a stud 404 secured on the usual T-shaped arm 405 which is secured to the shaft 192. Thus, when the paper carriage moves to a position where a large roll 380 depresses the repeat lever 350, the lever 393 will be rocked clockwise, except when prevented by means hereinafter described, and will rock the T arm 405 and shaft 192 clockwise in Figs. 6, 8 and 9. The connection of the shaft 192 with the total key bell crank 170 and the manner in which the rocking of the shaft 192 clockwise in Fig. 6 releases the lever 200 from the latch 199 to permit the spring 203 to condition the machine for total taking and to cause the motor to give the machine the cycle of operation for taking the total have been described previously.

As already mentioned, the spring 203 depresses the regular motor bar M after the total key is depressed and the motor bar M is then latched in depressed position by the repeat hook 240 engaging under the stud 241 on the lever 27. The lever 27, near its forward end, has a stud 406 which, when the regular motor bar M is depressed after depression of the total key T, moves down in front of the head of the T arm 405 and prevents the total key bell crank from returning to normal prior to the release and return to normal of the regular motor bar M.

A non-add roll 161 is so positioned on the carriage as to depress the non-add arm 160 (Fig. 3) when the carriage is in the column 5 position where the large roll 380 depresses the repeat lever 350. In the manner already explained, this depression of the non-add lever 160 by the non-add roll 161 moves the non-add pawl 150 to the active position of Fig. 3 where it prevents the passby pawl 821 from acting on the stud 148 of the lever 913 at the beginning of the return stroke of the cycle of operation. Consequently, the crossfooter is not disengaged from the actuators 33 at that time but remains engaged with the actuators during the return of the latter to normal so that the two rolls 380 and 161 together automatically cause a subtotal to be taken from the crossfooter in the same manner as though the subtotal key ST were depressed.

The large roll 380, which is active in the column 5 position of the carriage, is so positioned that it holds the slide 342 in such a position as to cause a further automatic cycle of operation of the machine when the paper carriage tabulates to the column 6 position. The position of said roll 380 is such that, while the paper carriage is at rest in the column 5 position, said roll 380 is above the highest portion of the passby pawl 351 (Fig. 18) carried by the repeat lever 350 and causes the repeat slide 342 through the lever 357—358 to hold the member 302 sufficiently counterclockwise from its Fig. 4 position to place the shoulder 307 in the path of the stud 308. This, as shown in Fig. 7, so limits the clockwise movement of the arm 309 during the forward stroke of the cycle that the passby pawls 315 and 316 do not pass below the roller 318 during the forward stroke and the repeat hook 240 is not released from the stud 241 during the return stroke of the cycle. Consequently, the motor bar M remains depressed at the end of the cycle and the total key T cannot restore to normal in the usual manner because the stud 406 is in front of the head of the T arm 405.

As the carriage tabulates toward the column 6 position near the end of the automatic subtotal-taking cycle initiated when the carriage was in the column 5 position, another repeat roll 410 passes over and beyond the apex of the passby pawl 351 on the repeat lever 350 and momentarily moves the repeat slide 342 sufficiently rearward to move the lower end of the pawl 332 rearward of the stud 331 so that the motor control link 33 is permitted to rise and cause the motor to give the machine a further automatic cycle of operation when the carriage arrives in the column 6 position. The total key T is still latched down and, as there is no non-add roll 161 acting on the non-add arm 160 when the carriage is in the column 6 position, the automatic operation of the machine initiated when the carriage reaches the column 6 position will be a total-taking operation at the end of which the cross-footer is left clear.

As the carriage roll 410, when the carriage has come to rest in the column 6 position, does not hold the slide 342 and the two-armed lever 357—353 sufficiently rearward to hold the shoulder 307 in the path of the stud 308 but permits the member 302 to be positioned by the stud 301 on the stem of the upper motor bar U which is in its normal raised position, the notch 305 of the member 302 is under the stud 308 and permits both passby pawls 315 and 316 to move their ends below the roller 318 during the forward stroke of the automatic total-taking cycle with the carriage in the column 6 position, with the result that, during the return stroke of said cycle, the repeat hook is unlatched from stud 241 which permits the motor bar M to return to normal and remove the stud 406 from in front of the head of the T arm 405 to permit the latter and the total key bell crank 170 to be returned to normal toward the end of said cycle by the usual spring 408 connected to an arm 409 secured to the shaft 192.

The automatic total control mechanism is restored to normal in the following manner:

A pawl 420 pivotally mounted on the forward upper arm 421 of the three-armed lever 262 (Figs. 6 and 9) has a hook portion 422 and a shoulder 423. The pawl 420 is urged clockwise by a spring 424. When the three-armed lever 262 is moved clockwise by roller stud 266 during the first half of each cycle, the pawl 420 is moved rearward, but, as long as the T arm 405 is in its forward normal position, the stud 404 engages the top of the hooked end 422 of the pawl 420 and holds it down so that the shoulder 423 will not engage a stud 425 on an upper arm of the latch lever 400. But, when the T arm 405 moves to the total-taking position of Fig. 6, the stud 404 moves away from the end 422 of the pawl 420 and permits the shoulder 423 to engage behind the stud 425 so that, when the three-armed lever 262 is rocked clockwise near the end of the forward stroke of the subtotal and total-taking cycles during which the T arm is in the total-taking position of Fig. 6, the pawl 420 rocks the latch 400 clockwise against the action of its spring 402 and thus unlatches the lever 396.

After the power spring 395 has acted to pull the total-taking control means to total-taking position, its tension has been largely relieved and, when the latch 400 has been released, a relatively light spring 426 (Figs. 6 and 9) suffices to swing the levers 393 and 396 counterclockwise, causing the lever 396 to follow the stud 266 during the return stroke of the cycle. The spring 426 thus returns the lever 393 to its normal position of Figs. 1 and 8.

The lever 393 is not relatched by the shoulder 391 on the latch lever 390 at the end of the subtotal-taking cycle initiated by the carriage roll 380 because said latch lever 390 is not in its normal position of Fig. 8. Near the end of the forward stroke of this cycle, the roller stud 266 cams the three-armed lever 262 clockwise and a rearward projection on the arm 421 engages a downwardly extending finger 427 of the lever 385 and rocks the latter counterclockwise to raise the lateral lug on the end of said lever above the hook 384 of the latch 382 but the latter is held out of latching position by the carriage roll 380 acting through the slide 342. Consequently, early in the return stroke of this cycle, the spring 387 returns the lever 385 to the position of Fig. 9 where it holds the latch lever 390 out of latching position.

During the forward stroke of the total-taking cycle initiated by the roll 410 with the carriage in the column 6 position, the stud 266 returns the levers 396 and 393 to the position of Fig. 6. The lever 396 is not now relatched in its normal position of Figs. 6 and 9 because the latch 400 is again moved out of latching position by the pawl 420, but the three-armed lever 262 and the lever 385 are again rocked counterclockwise to raise the lateral lug on the end of the lever 385 above the hook 384 at this time. As the carriage roll 410 does not hold the latch 382 out of latching position, the lever 385 is relatched in normal position so that, when the spring 426 again moves the lever 393 to its Fig. 9 position and the lever 396 to the dot-dash line position of Fig. 6 during the return stroke of the total-taking cycle, the shoulder 391 on the latch lever 390 can move behind the lug on the arm 392 of lever 393 and relatch the latter in normal position. Near the end of this cycle, the motor bar M returns to normal and the T arm 405 returns forward to normal position where the stud 404 again depresses the pawl 420 to remove its shoulder 423 from in front of the stud 425 so that the latch 400 is permitted to relatch the lever 396 when the latter is again returned to normal position and the spring 395 is retensioned by the stud 266 during the forward stroke of the next machine cycle, that is, the cycle following the total-taking cycle.

If the light spring 426 should fail to rock the lever 393 quite far enough counterclockwise (Fig. 9) during the return stroke of the total-taking cycle to permit it to be relatched by the latch lever 390, the lever 396 will still be relatched in normal position during the following cycle. In that case, the lever 393 would, nevertheless, be in about its Fig. 9 position at the beginning of said following cycle and depression of the regular motor bar M to initiate said following cycle would move the stud 406 down behind the T-head of lever 405 to hold the latter and the lever 393 in their Fig. 9 positions. Consequently, the shoulder 423 on the pawl 420 will be prevented from engaging the stud 425 on the latch 400. Thus, the latch 400 will be free to relatch the lever 396 during the cycle following the total-taking cycle. Also, near the end of the forward stroke of said following cycle, a bell crank 430 (Fig. 6) pivoted on a fixed stud 431 and having in its downward arm a slot receiving a stud on the upper end of the arm 421 of the three-armed lever 262 will be rocked counterclockwise by said three-armed lever 262 so that a cam head 432 on the end of the forward arm of said bell crank 430 will act on a stud 433 on the end of the arm 403 of the lever 393 and positively cam the latter far enough counterclockwise to permit the shoulder 391 on the latch lever 390 to drop behind the lateral lug on the arm 392 of said lever 393.

As already mentioned, it may occur that, in the illustrated machine set up for the example of work shown in Fig. 21, the crossfooter 55—56 contains a negative total or overdraft balance when the carriage reaches the column 5 position and the carriage roll 380 causes the latch 384 to be moved to release the lever 385 of the automatic total mechanism. Also, as previously mentioned, the "subtract" lever S and the crossfooter tumbling frame 57 are normally in the + positions when the carriage tabulates into the column 5 position at the end of the machine cycle initiated with the carriage in the column 4 position. (An exception to usual conditions will be referred to later.) In the above-mentioned circumstances, the previously mentioned total key—"subtract" lever—crossfooter interlock would prevent movement of the total key bell crank to total-taking position. The illustrated machine is provided with means somewhat different than the means disclosed in the previously mentioned Muller application Serial No. 177,435 for preventing release of the automatic total mechanism by the carriage roll 380 when the position of the crossfooter tumbling frame 57 does not correspond to the sign of the total in the crossfooter. This means is controlled by a portion of the above-mentioned interlock means which includes a three-armed lever 440 (Figs. 1, 6, 8 and 9) corresponding to the lever numbered 300, 303, 307 in the previously mentioned Pasinski Patent 1,778,506.

As disclosed in said Pasinski patent, the three-armed lever 440 is controlled from the highest order pinions of the crossfooter and occupies the position shown in Fig. 6 at all times while the total in the crossfooter is positive but is positioned clockwise of the Fig. 6 position with the pointed end of its lower arm forward of the detent stud 441 as in Figs. 8 and 9 while a negative total is present in the crossfooter. A stud 442 on the upper arm of the lever 440 engages in a slot with upturned ends in a link 443. The forward end of the link 443 is urged downward by a spring 444 and said link is movable forwardly and rearwardly under control of the lever 130, the position of which always corresponds to the position of the crossfooter tumbling frame 57. The arrangement is such, as disclosed in said Pasinski patent, that whenever the position of the crossfooter tumbling frame corresponds to the sign of the total in the crossfooter the stud 342 is in one or the other of the upturned ends of the slot in the link 443, the forward end of which, therefore, occupies a position at the same height as in Figs. 1, 6 and 9, but whenever the position of the crossfooter tumbling frame does not correspond to the sign of the total in the crossfooter the stud 342 is positioned in the low mid-portion of the slot so that the forward end of the link occupies a higher position as in Fig. 8 which shows the positions of the parts when the crossfooter tumbling frame is in its + position and the crossfooter contains a negative total.

A bail 450 extending across the upper front portion of the machine (Figs. 1, 6, 8 and 9) and pivotally mounted on the rod 451 is urged clockwise (Figs. 6, 8 and 9) in a manner which will be explained later, and has an arm 452 carrying a stud 453 engaging against the top edge of the forward portion of the link 443. At the left-hand side of the machine the bail 450 has an arm 455 (Fig. 3) having a yieldable connection 456 with a forward branch of a lever 457 which is pivoted at 458 and urged clockwise by a spring 459 which thus also urges the bail 450 counterclockwise in Fig. 3 and clockwise in Figs. 6, 8 and 9. At the right-hand side of the machine, the bail 450 has an arm 460 on the downward and rearward end of which is a lateral lug 461 adapted to cooperate with the end of the forward arm 462 of a latch lever fixed on the shaft 30 and having a downwardly and rearwardly extending arm 463 with a hooked end adapted to cooperate with a squared stud 464 on the lever 385. The latch lever 462—463 is urged counterclockwise by a spring 466 (Fig. 8) connected to an arm 467 also fixed on the shaft 30.

When the position of the crossfooter tumbling frame 57 corresponds to the sign of the total in the crossfooter and the forward end of the link 443 occupies a lower position as in Fig. 3 or 9, the bail 450 and arm 460 occupy the position shown in Figs. 6 and 9, and the lever 457 occupies the position of Fig. 3 where its upper end is forwardly of a stud 454 on the total key bell crank 170 and does not interfere with depression of the total key. During each cycle of operation of the machine, when the three-armed lever 262 is rocked clockwise by the stud 266, it rocks the lever 385 counterclockwise to raise the rear end of the latter above the position of Fig. 1, i. e., substantially above the hook 384 of the latch yoke 382. In this movement of lever 385, a stud 465 on said lever acts on the rear cam edge of the arm 463 and rocks the latch lever 462—463 clockwise to lift the forward end of the arm 462 above the lateral lug 461 on the arm 460 and to place the hooked end of the arm 463 under the squared stud 464.

It will be remembered that the tumbling of the crossfooter, when it is effected, occurs during the forward stroke of the machine cycle. If such tumbling of the crossfooter occurs in a cycle of machine operation initiated when the carriage occupies the columnar position ahead of a total-taking or subtotal-taking columnar position and tumbles the crossfooter to a position not corresponding to the sign of the total in the register at that time, the front end of the link 443 will be elevated at the time the crossfooter is tumbled and the bail 450 will be rocked to place the lateral lug 461 on the arm 460 beneath the end of arm 462 so that the hooked end of the arm 463 is prevented from moving out from under the stud 464. The bail 450 will also move the upper end of the lever 457 under the stud 454 on the total key bell crank 170 to block depression of the total key. If the amount entered into the crossfooter during the return stroke of the cycle does not change the sign of the total to bring it into agreement with the position of the crossfooter tumbling frame 57, the lug 461 on arm 460 will remain under the end of arm 462 and the lever 385, when released from the latch 384 by the roll 380 as the carriage moves into the balance column, will not be permitted to move far enough to trip the latch 390 and release the arm 392.

Thus, if the sign of the total in the crossfooter and the position of the crossfooter tumbling frame 57 do not correspond when the carriage arrives in the balance column, the machine will not automatically perform a subtotal-taking or total-taking cycle. Moreover, the total key and subtotal key will be locked. If, however, the amount entered in the crossfooter during the return stroke of the cycle in which the crossfooter is tumbled, with the carriage in the columnar position preceding the balance columnar position, should change the sign of the total in the crossfooter to bring it into agreement with the tumbled position of the crossfooter, the bail 450 will be moved to move the upper end of the lever 457 forward from under the stud 454 and the lateral lug 461 on the arm 460 forward from under the end of the arm 462, which permits the latch lever 462—463 to move counterclockwise to withdraw the hooked end of the arm 463 from under the stud 464 so that, as the carriage reaches the balance columnar position and the roll 380 on the carriage operates the latch 384, the lever 385 will be free to trip the latch 390 and release the automatic total mechanism to give the machine an automatic total-taking or subtotal-taking cycle of operation.

With the illustrated machine set up for the example of work illustrated in Fig. 21, it will usually happen that the tumbling of the crossfooter, during the forward stroke of the cycle of operation of the machine when the carriage is in column 4 or "deposit" columnar position which immediately precedes column 5 or first "balance" columnar position, will position the crossfooter tumbling frame 57 in correspondence with the sign of the total in the crossfooter so that, at the end of the forward stroke of said cycle when the forward end of arm 462 is elevated, the lug 461 on the arm 460 will be forward of the end of arm 462 and the latch lever 462—463 may return to releasing position with the forward end of arm 462 behind the lateral lug 461 on the arm 460 during the return stroke of said cycle. Then, the lever 385 will be free of the latch arm 463 when the carriage tabulates into the "balance" columnar position.

No misoperation can result from the fact that the end of the arm 462 is behind the lug 461 on the arm 460 during the return stroke of the cycle initiated with the carriage in the columnar position preceding the balance columnar position, because any amount entered in the crossfooter during the return stroke of a cycle, in the forward stroke of which the crossfooter is tumbled into a position in agreement with the sign of the total in the crossfooter, will also always be of the same sign of the total and cannot change the sign of the total and, therefore, can never require that the lug 461 on the arm 460 should move rearward to a latching position under the end of arm 462.

Thus, it will be seen that the bail 450, arm 460, and latch lever 462—463 will always prevent operation of the automatic total mechanism under the control of the carriage when the carriage reaches the "balance" columnar position at any time when the position of the crossfooter tumbling frame 57 does not agree with the sign of the balance in the crossfooter.

If the machine does not automatically perform a subtotal-taking or total-taking cycle when the carriage reaches the "balance" columnar position, the operator may proceed with the work in a number of ways depending upon the practice of the office or bank and the nature of the work to be performed. In the work illustrated in Fig. 21, consisting of the posting of bank customers' checking accounts, the failure of the machine to perform a balance printing cycle when the carriage arrived in the "balance" column would be due to the presence of a negative total or overdrawn balance in the crossfooter, provided that the operator did not manually interfere with the automatic control of the subtract lever S at the time of initiating a machine cycle with the carriage in the "deposit" columnar position immediately preceding the first balance columnar position. Also, it would usually be undesirable to print an overdraft balance on the customer's statement form. In such circumstances, it is possible for the operator manually to return the carriage to one of the preceding columns such as "deposit" columns, set up on the keys the amount of the check which caused the overdraft, hold the subtract lever in the adding position manually, if required, give the machine a cycle of operation during which the amount of the check would be added in the crossfooter so that the total in the crossfooter would again become positive. During this cycle, the lever 385 will be relatched by the latch 382, 384 before the lug 461 moves forward from under the end of the arm 462 but at the end of the cycle the carriage will again tabulate into the "balance" columnar position where the roll 380 will trip the latch to cause an automatic cycle of operation of the machine during which the balance will be printed.

In some classes of work, however, the object of preventing an automatic balance printing cycle of operation of the machine when the carriage tabulates into the balance columnar position might be merely to give the operator warning of the presence of a balance of a sign opposite to that normally present when the carriage reaches such position and to forcibly impress such warning on the mind of the operator by requiring the operator to perform special acts whenever a balance of such nature is encountered. In such a case, the operator may proceed to cause the balance to be printed in the balance column. The most simple procedure requires the operator to move the "subtract" lever S to the position corresponding to the sign of the total in the crossfooter and hold it there while manually depressing the regular motor bar M to give the machine a spacing cycle. Fig. 8 illustrates the position of the parts as the carriage arrives in the first balance columnar position with a negative total in the crossfooter with the machine set up for the work illustrated in Fig. 21. After shifting the "subtract" lever S to its — position, depression of the motor bar M will give the machine a spacing cycle during which the crossfooter tumbling frame 57 will be tumbled to the position corresponding to the sign of the total and the bail 450 will be rocked to withdraw the lug 461 from under the end of the arm 462. The lever 385 will now be free from both the latch 463 and 384 but a balance-printing cycle will not automatically follow the spacing cycle because the roll 380 on the carriage has caused the motor bar to remain latched down at the end of this spacing cycle with the carriage in the "balance" columnar position and the stud 406 remains down behind the T-head of the lever 405, thus preventing clockwise rocking of the shaft 192.

During the above-described spacing cycle, the carriage does not tabulate but remains in the same columnar position because the tabulating mechanism, as previously explained, is disabled by the slotted stop for the "balance" columnar position and remains disabled until the total key bell crank is moved to total-taking position. Thus, the carriage roll 380 continues to hold the repeat arm 350 down and causes the repeat slide 342 to continue to hold the pawl 332 rearward of the stud 331 on the motor control link 33. Though the motor bar M remains latched down and the motor control link 33 is held down by neither the pawl 332 nor the latch 375 controlled by the abutment 74, still an automatic cycle of the machine does not follow the above-described spacing cycle. Because the carriage remains stationary in the same columnar position, the latch 375 is held in the ineffective position of Fig. 7, and as the pawl 332 is held rearward of the stud 331 throughout the spacing cycle while the motor bar remains latched down, the spring 34 will maintain the projection 330 of the motor control link 33 in contact with the stud 266 throughout most of the return stroke of the spacing cycle. However, the repeat hook 240 and the slot in the upper end of the link 33 are so proportioned that, when the motor bar M is latched down by the repeat hook 240 without manual pressure on said motor bar, and link 33 is pulled upward relatively slowly during the return stroke of a cycle as the projection 330 follows the stud 266, the stud 32 on the lever 27 does not permit the link 33 to move upward quite far enough to engage the clutch and close the motor switch. Instead, the link 33 stops slightly before the full-stroke sector returns to normal position so that, at the end of the spacing cycle, there is a slight clearance between the projection 330 and the stud 266. One-sixteenth of an inch is sufficient. The regular motor bar M can be manually depressed slightly below the position in which it is latched by the repeat hook 240 and, when manually depressed, it, therefore, pulls the motor control link 33 upward to bring the projection 330 into contact with the stud 266. This slight additional upward movement of the link 33 is sufficient to engage the clutch and close the motor switch. This arrangement does not prevent the machine being given an automatic cycle when the paper carriage tabulates to a new columnar position as, for example, when the carriage tabulates into the column 4 position when set up for the example of work illustrated in Fig. 21. While the carriage is tabulating, the lug 377 on the latch 375 moves over the shoulder 378 on the link 33 and prevents the projection 330 from following the stud 366 during the return stroke of the cycle in which the carriage tabulates. Also, the pawl 332 normally moves over the stud 331 when the link 33 is depressed by the stud 266 and the pawl 332 remains over the stud 331 until either the motor bar M returns to normal or the repeat slide 342 moves the pawl 332 rearward. When the carriage tabulates into a columnar position where an automatic cycle is desired, a repeat roll on the carriage moves the slide 342 rearward and thus removes the pawl 332 rearward from above the stud 331. The retraction of the latch 375 and of the pawl 332 under such circumstances occurs after the stud 266 has returned to normal so that, if the motor bar M is latched down at that time, the spring 34 will move the link 33 upward very rapidly whereby said link 33 and the parts operated thereby acquire a momentum which, when the lower end of the slot in the link 33 contacts the stud 32, rocks the levers 27 and 28 counterclockwise and clockwise, respectively, in Fig. 6 against the tension of the spring 31, and causes the link 33 to move upward until the projection 330 is stopped by the stud 266, after which the link 33 is returned downward a slight distance again by the spring 31. However, the extra upward movement of the link 33 caused by its momentum engages the clutch and closes the motor switch. As already mentioned, however, the latch 375 and pawl 332 are inactive during the spacing cycle while the carriage remains stationary in the balance column and the link 33 returns upward relatively slowly without gaining sufficient momentum to move it upward beyond the position determined by the repeat hook 240 and the automatic cycle does not follow the spacing cycle. To further insure the prevention of an automatic cycle following the spacing cycle, a spring 469 (Fig. 10) is connected to the rear end of the lever 27 to urge said lever clockwise and aid the spring 31 in checking the upward movement of the link 33 when the projection 330 follows the stud 266 during the return stroke of the spacing cycle.

With the parts in the positions of Fig. 8 before the spacing cycle, they will move during the spacing cycle to the positions of Fig. 9. As shown in Fig. 9, the illustrated machine has a key 470 on a crank 471 which is pivoted on shaft 29 and has a stud 473 engaging a lever 474 which is pivoted at 475. Depression of the key 470 causes the stud 473 to rock the lever 474 counterclockwise so that a projection 476 on said lever engages another lug 477 on the slide 326 and moves said slide forward whereby its lug 327 operates the repeat hook 240 to permit the motor bar M to return to normal. Immediately the stud 406 has cleared the T-head of the arm 405, the latter and the shaft 192 can be rocked by the spring 395 to cause an automatic cycle during which the true balance in the crossfooter will be printed.

After the carriage arrives in the "balance" columnar position with the sign of the total in the crossfooter not in agreement with the position of the crossfooter tumbling frame, and with the automatic total mechanism locked, it is also possible for the operator to proceed in another manner.

The illustrated machine is provided with a key usually referred to a "cycle normal" key designated CN in Figs. 4 and 5. The stem 480 of said key is pivoted on a cam lever 481 (Fig. 5) which is rockably supported on the shaft 345. If the key CN is moved rearward after it is depressed, the lower edge of the notch 482 in the stem can be moved under the edge of the top plate of the keyboard in the usual manner to latch the key in depressed position for any desired length of time at the end of which the key may be released by simply moving it forward to free the notch 482 from the edge of the keyboard plate and allow the key to be snapped up to normal position by its spring 483 (Fig. 4). The upper forward cam end of the lever 481 is adapted to cooperate with a stud 484 on the repeat slide 342 in such a manner that, when the key CN is depressed, it cams the slide 342 to its normal position of Fig. 4, if it is not already in such position, and holds the slide in such position as long as the key remains depressed. When the carriage is in the balance columnar position, the roll 380 holds the lever 344 in a rearward position such that the slide 342 is yieldingly held in a rearward position where the upwardly extending forward end of the slide holds the latch 384 in releasing position and the slide 342 holds the member 302 with its shoulder 307 in the path of the stud 308. However, when the slide 342 is cammed back to the position of Fig. 4 by the lever 481 when the cycle normal key CN is depressed, the slide 342 through the stud 356 engaging in the slotted end of the arm 357 returns the latter arm and arm 358 to the position of Fig. 4, removing the latter arm away from the stud 359.

If the operator now depresses the cycle normal key and latches it in depressed position, moves the subtract lever to the position corresponding to the sign of the balance in the crossfooter and depresses the regular motor bar to give the machine a spacing cycle of operation, the crossfooter is tumbled and the bail 450 is moved to withdraw the lateral lug 461 from beneath the end of arm 462 during the forward stroke of the spacing cycle so that, at the beginning of the return stroke of this spacing cycle, the hooked end of the latch arm 463 is moved out of the path of the stud 464. However, during the forward stroke of this spacing cycle, the lever 385 is relatched above the hook 384 of the latch yoke 382 which was permitted to return to latching position when the repeat slide 342 was cammed forward by depression of the key CN. Therefore, a balance printing cycle of the machine will not be initiated automatically at the end of the spacing cycle. During the return stroke of the spacing cycle, the regular motor bar is released and permitted to return to normal because the forward movement of the repeat slide 342 by depression of the key CN also moved the upper end of the arm 358 forward and the member 302 was permitted to move clockwise in Fig. 4 until its stud 301 engaged against the lower rear cam edge of the finger 300 of the stem of the upper motor bar U which, during said spacing cycle, is in its normal upper position. Thereby, the notch 305 was placed in the path of the stud 308 and both pawls 315 and 316 were permitted to pass the roller 318 during the forward stroke of the spacing cycle and to act on said roller during the return stroke of the cycle to release the repeat hook 240 from the stud 241. The machine, therefore, comes to rest at the end of the spacing cycle and the carriage remains in the same columnar position because of the automatic disablement of the tabulating mechanism as previously explained. If, now, the operator releases the repeat normal key CN and permits it to return to its normal upward position, the cam lever 481 frees the slide 342 which is thereupon moved rearward by the spring 353 until the forward end of the slot in said slide 342 engages against the stud 343 in the lever 344 which is held in its rearward position by the roll 380 on the carriage. This rearward movement of the slide 342 causes the upwardly extending forward end of said slide to move the latch 384 to release the automatic total mechanism which thereupon initiates an automatic balance printing cycle of the machine in the manner already described.

If the operator, at the time of entering the amount of a check in one of the check columns, in performing the kind of work illustrated in Fig. 21, is aware of the fact that the subtraction of the amount of the said check from the positive balance in the crossfooter will produce a negative or overdraft balance in the crossfooter, the operator may, if permitted by the practice of the bank, cause the overdrawn balance to be automatically printed in the balance column in a more direct and shorter manner, provided there is no item to be entered in the "deposit" column. To initiate the cycle for subtracting the amount of the check, the upper motor bar U may be depressed and manual pressure immediately withdrawn. Then the operator may manually hold the "subtract" lever S in the subtract position when the carriage tabulates to the deposit columnar position as well as during the automatic cycle of operation which will be performed while the carriage is in the deposit columnar position. During the automatic cycle in the deposit column the crossfooter tumbling frame will remain in its − position because of the "subtract" lever S being held in the − position. Therefore, when the carriage tabulates into the first balance columnar position, the bail 450 will be in the position of Figs. 1 and 9 because the position of the crossfooter tumbling frame corresponds to the sign of the total in the crossfooter and the roll 380 on the carriage will cause the release of the automatic total mechanism by which a balance printing cycle of the machine will be automatically initiated while the operator still holds the "subtract" lever S in the − position. If the operator permitted the lever S to return to the + position under the influence of the spring 135 before the total key bell crank 170 is rocked to total-taking position, said bell crank would become locked by the previously mentioned interlock and the balance printing cycle would be blocked until the operator manually returned the "subtract" lever to the − position. After the total key bell crank has been rocked to total-taking position, however, the operator may release the lever S which is held in the usual way against movement while the total key remains depressed. It will be recalled that the total key bell crank remains in the total-taking position continuously from the start of the subtotal-taking operation with the carriage in the column 5 position in the example of work illustrated in Fig. 21 until the end of the total-taking operation in column 6.

*Presettable selective carriage return*

The carriage return mechanism and the manner in which it is set into operation by downward movement of the link 95 and then stopped when the carriage has returned to its column 1 position have been described above. The machine of the present invention is provided with means which are preconditioned or preset when the machine is operated with the paper carriage in a predetermined position corresponding to a column on the work sheet allotted to entries upon which are based the analysis or other data to be entered in a nonadjacent subsequent column, to cause the carriage return mechanism to operate to return the carriage from an intermediate columnar position if no data are to be entered in said subsequent columnar position but to permit the carriage to move into said subsequent columnar position if data are to be entered in the subsequent column and permitting entry of said data before operating to return the carriage. In the illustrated machine set up for the example of work shown in Fig. 21, said means is constructed and arranged as follows:

The lower end of the link 95 has a slot receiving a stud 490 on the rear end of a lever 491 pivotally mounted on a fixed stud 492 and urged clockwise in Fig. 11 by a spring 493. The forward arm of said lever 491 has a cam portion 494 positioned in the path of a stud 495 on an arm 496 secured to the clutch shaft 40 which, as already described, makes a single complete revolution during each cycle of operation of the machine. The arm 496 and stud 495 are so arranged on said clutch shaft that the stud 495 engages the cam portion 494 and rocks the lever 491 counterclockwise in Fig. 11 immediately after operation of the printing mechanism near the end of the forward stroke of the cycle of machine operation. Thereby, the stud 490 is depressed, but it normally moves idly in the slot in the end of link 95. To enable the downward movement of the stud 490 to pull down the link 95 at selected times, a coupling member 497 is pivotally connected at 498 to the link 95 and is urged counterclockwise to coupling position by a spring 499. However, the coupling member 497 is normally held in the uncoupling position of Fig. 11 by engagement of a forwardly extending projection 500 of said coupling member by a stud 501 on an arm 502 secured to the shaft 277 to which is also secured an upwardly extending arm 503 connected to a spring 504 which urges the arms 502 and 503 and the shaft 277 clockwise to maintain the upper end of the arm 503 in contact with a stud 505 on the lower end of an arm 506 pivotally mounted on a fixed stud 507. The spring 504, acting through arm 503 and stud 505, also normally maintains the arm 506 in the position of Fig. 11 in engagement with a stud 508 on the machine frame. The arm 506 also carries a stud 510 engaged by the upper arm 511 of a bell crank 512 pivotally mounted at 513 and having a forward arm 514 connected to one end of a spring 515 which urges said bell crank 512 counterclockwise in Fig. 11. The arm 514 of the bell crank has a hooked forward end passing forward over and rearward and downward under the stud 126 on the plate 129 secured to the shaft 800 of the machine whereby the bell crank 512 is normally held against being moved counterclockwise by the spring 515.

The arrangement is such that, during the forward stroke of each cycle of operation of the machine when the shaft 800 is rocked counterclockwise (Fig. 11) moving the stud 126 rearward in the hooked portion of the arm 514, the latter, if otherwise free, could be rocked counterclockwise by the spring 515 causing the arm 511 engaging the stud 510 to move the arm 506 and stud 505 rearward to rock the arm 503, the shaft 277, and the arm 502 counterclockwise, overcoming the spring 504 and removing the stud 501 from the projection 500 to permit the coupling member 497 to be moved to coupling position by its spring 499 in time to permit the hooked lower end of the coupling member 497 to engage under the stud 490 before the latter is moved downward during the cycle of operation of the machine. Thereby, the link 95 would be pulled downward to set the carriage return mechanism into operation. However, the arm 514 carries a stud 520 which extends under the lower ends of the three arms 521, 522 and 523 (Figs. 11 to 17) which are pivotally mounted on a stud 524 and urged counterclockwise by the springs 525, 526 and 527, respectively. These springs normally hold rearwardly extending projections of all three of the arms 521, 522 and 523 against a fixed stud 528, whereby these arms are normally positioned as in Fig. 11 with their lower ends above the stud 520, thereby normally preventing the arm 514 from moving counterclockwise during the machine cycle to start the carriage return mechanism in the manner described above. The arms 521, 522 and 523 are selectively movable clockwise to remove their lower ends from above the stud 520 by means which will now be described.

The means by which, in an operation of the machine initiated by the depression of the upper motor bar U, the shaft 259 and arm 270 are rocked clockwise in Fig. 11 and the link 271 pulled upward and rearward has already been described. A pawl 530 pivotally mounted on the link 271 is urged counterclockwise to the position of Fig. 11 by a spring 531 and carries a stud 532 underlying the rearward projection of the arm 521. Normally, a stud 533 on a rearward arm of a link 534 slidable on the stud 535 is engaged behind a shoulder on the rear edge of the arm 521 as shown in Fig. 11, thus preventing the latter from rocking clockwise. Thus, normally, when the link 271 is moved upward and rearward, the spring 531 yields and the pawl 530 is rocked on its pivot. However, when the carriage reaches the "deposit" column 4 position, i. e., the columnar position for the entries upon which the analysis data of column 7 are to be based, a roll 536 adjustably mounted on the carriage engages and depresses the end of one arm 537 of a yoke 538 rockably mounted on the shaft 139 and thereby elevates the forked end of a second arm 539 of said yoke. In the notched end of the arm 539 is engaged the rear end of a lever 540 which is pivotally mounted on a fixed stud 541 and connected at its forward end to the lower end of the link 534. Thus, the depression of the end of arm 537 by the carriage roll 536 causes the link 534 to be pulled downward.

The roll 536 is of a size which is sufficient to move the stud 533 slightly below the shoulder on the rear edge of the arm 521. Thus, if a cycle of machine operation is initiated by depression of the upper motor bar U while the carriage roll 536 holds the end of the arm 537 down, as is the case in the column 4 position of the paper carriage of the illustrated machine set up to perform the example of work illustrated in Fig. 21, the stud 532 will act to rock the arm 521 clockwise to the position of Fig. 12 when the shaft 259 is rocked clockwise during said cycle of operation. At this time, the hooked end of a spring-urged latch member 545 pivotally mounted on the arm 521 engages behind a stud 546 on an upward extension of the arm 514 whereby the arm 521 remains latched in the position of Fig. 12 after the shaft 259 and link 271 return to their normal positions during the return stroke of the cycle. The arm 514 is still restrained from moving counterclockwise as the lower ends of the arms 522 and 523 are still above the stud 520.

The subtotal-taking and total-taking operations with the carriage in the column 5 and 6 positions are normally effected automatically as already described but can also be controlled manually by manual depression of the total key if the cycle normal key CN previously described is latched in depressed position. The movements of the arms 522 and 523 will be described as they occur during automatic subtotal-taking and total-taking cycles of operation of the machine with the paper carriage in the column 5 and column 6 positions, respectively.

When the carriage tabulates to the column 5 position, the arms 522 and 523 will be in the position shown in Fig. 12 if the upper motor bar U was in depressed position during the cycle performed while the carriage was in the column 4 position as the result of either depressing the upper motor bar after the carriage reached the column 4 position to manually initiate said cycle or depressing said upper motor bar with the carriage in a preceding columnar position and immediately withdrawing manual pressure so as to cause an automatic cycle when the carriage arrived in the column 4 position. As the carriage reaches the column 5 position, with the position of the crossfooter tumbling frame 57 corresponding to the sign of the total in the crossfooter, the roll 380 releases the automatic total mechanism which, in the manner previously explained, then causes the total key bell crank 170 to be rocked clockwise in Fig. 3 and move link 222 rearward. As shown in Fig. 11, the link 222 has a depending arm 550 carrying a squared stud 551 which, when the link 222 is moved rearward by the total key bell crank 170, engages the inclined end of a lever 552 which is pivotally mounted on the stud 507 and has a downward arm connected with one end of a spring 553 which urges the lever 552 counterclockwise to the position of Fig. 11 where it is stopped by engagement of said downward arm against the stud 508. When the forward arm of the lever 552 is cammed downward by the stud 551, a stud 554 carried by the forward end of said arm acts on an upwardly extending finger of the arm 523 to cam the latter arm clockwise from the position of Fig. 12 to the position of Fig. 16, thus leaving only the lower end of the arm 522 above the stud 520 to prevent the arm 514 from rocking counterclockwise to start the carriage return mechanism.

At the end of the automatic subtotal-taking cycle performed with the carriage in the column 5 position, the carriage tabulates to the column 6 position and the motor bar and the total key or subtotal key remain latched down as previously explained. During the subtotal cycle with the carriage in the column 5 position, the roll 380 causes the slide 342 to hold the pawl 332 rearward of the path of the stud 331 but the carriage tabulates and moves the roll 380 from the arm 332 in time to permit the pawl 332 to move above the stud 331 and the movement of the tabulating abutment permits the latch lug 377 to move above the shoulder 378. When the carriage arrives in the column 6 position, the roll 410 again moves the slide 342 rearward and pulls the pawl 332 rearward from above the stud 331 and, as the carriage is arrested by the column 6 column stop 73 engaging the abutment 74, the latch lug 377 is pulled off of the shoulder 378 on the link 33. As the stud 266 has by now reached its normal position, the spring 34 snaps the link 33 upward and gives the latter sufficient momentum to initiate a further cycle of operation.

As the paper carriage moves into the column 6 position, a roll 555, adjustably mounted on the paper carriage, depresses the arm 537 of the yoke 538 and depresses the link 534. The roll 555 is of a size sufficient to pull the link 534 downward to such an extent as to cause a stud 556 carried by said link to engage the forwardly projecting finger of the arm 522 and rock the latter arm to the position of Fig. 14. From this it will be seen that, with the carriage in the column 6 position and the total key bell crank 170 latched in totaltaking position, the lower ends of all three arms 521, 522 and 523 are rearward of the stud 520. Consequently, during the total-taking cycle, when the plate 129 carrying the stud 126 is rocked counterclockwise during the forward stroke of said cycle, the arm 514 is free to be pulled counterclockwise by the spring 515 and, in the manner already described, couple the link 95 to the stud 490 so that the link 95 will be pulled down after operation of the printing mechanism at the end of the forward stroke of the cycle and set the carriage return mechanism into operation to return the carriage to its column 1 position where the carriage return mechanism is again automatically stopped by the release member 116.

Thus, as the result of the upper motor bar U being in depressed position during the machine cycle performed while the paper carriage was in the column 4 position in performing the example of work illustrated in Fig. 21, the carriage return mechanism is automatically set into operation during the cycle performed with the carriage in the column 6 position to return the carriage to the column 1 position without permitting it to tabulate into the column 7 position.

When the arm 514 is rocked counterclockwise during the total-taking cycle with the carriage in the column 6 position, it moves the stud 546 above the hooked end of the latch member 545 and thus permits the arm 521 to return toward normal until it is stopped by its lower end engaging the rear side of the stud 520. The movement of the paper carriage out of the column 6 position removes the roll 555 from the yoke arm 537, thus permitting the link 534 to return toward its normal position of Fig. 11, so that the stud 556 permits the arm 522 to return toward its normal position until its lower end engages the stud 520. The restoration of the total key at the end of the total-taking cycle returns the link 222 forward to its normal position of Fig. 11 which permits the spring 527 to return the arm 523 also toward its normal position of Fig. 11. At the end of the total-taking cycle, the stud 126 returning to its Fig. 11 position and acting on the hooked end of the arm 514, returns the latter to normal and moves the stud 520 below the lower ends of the three arms 521, 522 and 523 which are then permitted to position their lower ends above the stud 520. The return of the arm 514 to normal also acts through the arms 511, 506, 503 and 502 to return the coupling member 497 to its normal uncoupled position of Fig. 11.

In the event that the upper motor bar was not in depressed position during the cycle performed with the carriage in the column 4 position but said cycle was initiated by depression of the regular motor bar M, it will be understood that the arm 521 would not have been moved rearward of the stud 520 and latched in such rearward position at that time. Consequently, while the carriage is in the column 5 and column 6 positions, the arm 521 would still have been in its normal position above the stud 520 as illustrated in Fig. 17 and thus would have prevented clockwise movement of the arm 514 to set the carriage return mechanism into operation during the total-taking cycle performed with the carriage in its column 6 position. Consequently, at the end of said total-taking cycle, the carriage would have tabulated into its column 7 position to permit the operator to set up on the keyboard the analysis or other data to be entered in column 7.

Upon movement of the carriage into the column 7 position, a large roll 560 adjustably mounted on the carriage engages and depresses the yoke arm 537, thereby pulling the link 534 downward far enough to cause the stud 556 to engage the forwardly projecting fingers of all three of the arms 521, 522 and 523 and rock all three arms clockwise to the position of Fig. 15 so that the lower ends of all three of said arms are rearward of the stud 520 and the arm 514 is permitted to be rocked clockwise by the spring 515 when the stud 126 moves rearward during the cycle of machine operation initiated by the depression of the regular motor bar M with the carriage in its column 7 position. Consequently, after operation of the printing mechanism at the end of the forward stroke of the cycle initiated with the carriage in its column 7 position, the carriage return mechanism will be set into operation to return the paper carriage to its column 1 position. As the carriage returns, the roll 560 moves off of the arm 537 and permits all three arms 521, 522 and 523 to return to normal.

It was previously mentioned that the balance-printing operations with the carriage in the column 5 and 6 positions can be manually initiated by depressions of the total key if the cycle normal key is latched in depressed position. In that case, the movements of the arms 521, 522 and 523 will be practically the same as described above in the automatic balance-printing cycles but with one exception. When the cycle normal key CN is latched in its depressed position, the slide 342 is held rearward so that the shoulder 307 is not positioned in the path of the stud 308. Instead, because the upper motor bar U is in its normal upper position during the cycles initiated by depression of the total key, the notch 305 of the member 302 will be in the path of the stud 308 and the regular motor bar M, which is depressed by the mechanism released by depression of the total or subtotal key for the first balance-printing operation with the carriage in the column 5 position, will be released and returned to normal at the end of said cycle as will also the total or subtotal key. Consequently, the arm 523 will return to the position of Fig. 13 at the end of the balance-printing cycle manually initiated with the carriage in its column 5 position. The arms 521, 522 and 523 will then be in the Fig. 13 position as the carriage reaches the column 6 position. However, the operator will again depress the total key to initiate the second balance-printing operation with the carriage in its column 6 position and this will move the arm 523 back to its position of Figs. 14 and 17 which show the arms 522 and 523 in the positions which they always have at the beginning of the total-taking cycle performed with the carriage in the column 6 position, whether said cycle is manually or automatically initiated.

Thus, the invention provides a means which, when the paper carriage is in a predetermined columnar position, is adapted to be preset or preconditioned either to permit the paper carriage to tabulate into a nonadjacent subsequent columnar position after an operation of the machine performed with the paper carriage in an intermediate columnar position immediately preceding said subsequent columnar position or to cause said paper carriage to be returned from said intermediate columnar position without tabulating into said subsequent columnar position after the operation performed by the machine with said paper carriage in said intermediate columnar position.

While the specific construction and embodiment of the invention heretofore described in connection with and illustrated in the accompanying drawings is particularly well adapted for the performance of the example of work illustrated in Fig. 21 as well as many other varieties of work, it is to be understood that the invention is not limited to the specific construction and arrangement of parts and mechanisms described and illustrated but is also capable of embodiment in various other forms and arrangements within the scope of the appended claims.

I claim:

1. A machine of the class specified having means for giving it cycles of operation, a traveling carriage movable to a plurality of columnar positions, carriage tabulating means normally operating in each cycle of machine operation to tabulate said carriage to the next columnar position in one direction, carriage return means for returning said carriage in the opposite direction, a member moved by said cycling means in machine cycles, means controlled by said carriage in accordance with the positions thereof, and control means governed by said carriage-controlled means to enable said moved member to render said carriage return means effective in a cycle of machine operation initiated when the carriage is in a predetermined columnar position, said control means including means presettable when the carriage is in a columnar position preceding and nonadjacent to said predetermined columnar position to cause said control means to enable said moved member to render said carriage return means effective in a cycle of machine operation initiated when said carriage is in a columnar position intermediate said predetermined and preceding columnar positions.

2. A machine of the class specified having a power drive means, a plurality of manipulative means for causing said drive means to give the machine cycles of operation, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation initiated when the carriage is in a predetermined columnar position, said control means including means presettable under control of a predetermined one of said manipulative means when conditioned to initiate a machine cycle when the carriage is in a columnar position preceding and nonadjacent to said predetermined columnar position to enable said control to render said carriage return means effective in a cycle of machine operation initiated when said carriage is in a columnar position intermediate said predetermined and preceding columnar positions.

3. A machine of the class specified having means for giving it cycles of operation, a member moved by said drive means during machine cycles, a traveling carriage movable to a plurality of columnar positions, carriage tabulating means, carriage return means, means controlled by said carriage, and control means governed by said carriage-controlled means to enable said moved member to render said carriage return means effective in a cycle of machine operation performed when the carriage is in a predetermined columnar position, said control means including means presettable when the carriage is in a columnar position preceding and nonadjacent to said predetermined columnar position to cause said control means to enable said moved member to render said carriage return means effective in a cycle of machine operation performed when said carriage is in a columnar position intermediate said predetermined and preceding columnar positions, and means to retain said presettable means in preset condition when preset and governed by said control means to release said presettable means as said control means enables said moved member to render said carriage return means effective.

4. A machine of the class specified having means for giving it cycles of operation, function control means, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation performed when the carriage is in a predetermined columnar position, said control means including means manually presettable when the carriage is in a columnar position preceding and nonadjacent to said predetermined columnar position and means controlled by said function control means when conditioned for a predetermined machine function to cause said control means to render said carriage return means effective in a cycle of machine operation initiated to perform a predetermined function when said carriage is in a columnar position intermediate said predetermined and preceding columnar positions.

5. A machine of the class specified having means for giving it cycles of operation, a registering mechanism, amount entering means, total-taking control means, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation performed when the carriage is in a predetermined columnar position, said control means including means manually presettable when the carriage is in a columnar position preceding and nonadjacent to said predetermined columnar position and means controlled by said total-taking control means when conditioned for total taking to cause said control means to render said carriage return means effective in a total-taking cycle of machine operation performed when said carriage is in a columnar position intermediate said predetermined and preceding columnar positions.

6. A machine of the class specified having a power drive means, a plurality of manipulative means to cause said drive means to give said machine cycles of operation, function control means, a traveling carriage movable to a plurality of columnar positions, carriage tabulating means, carriage return means, means controlled by said carriage in accordance with the positions thereof and control means governed by said carriage controlled means to render said carriage return means effective in a cycle of machine operation performed when the carriage is in a predetermined columnar position, said control means including means presettable under control of a predetermined one of said manipulative means when the carriage is in a columnar position preceding and nonadjacent to said predetermined columnar position and means controlled by said function control means when conditioned for a predetermined machine function to cause said control means to render said carriage return means effective in a cycle of machine operation performed when said carriage is in a columnar position intermediate said predetermined and preceding columnar positions.

7. A machine of the class specified having a power drive means, at least three manipulative means for causing said drive means to give the machine cycles of operation, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation performed when the carriage is in a predetermined columnar position, said control means including means presettable by manipulation of a predetermined one of said manipulative means to initiate a machine cycle when the carriage is in a columnar position preceding and nonadjacent to said predetermined columnar position and means controlled by a predetermined other one of said manipulative means to cause said control means to render said carriage return means effective in a cycle of machine operation initiated by said predetermined other manipulative means when said carriage is in a columnar position intermediate said predetermined and preceding columnar positions.

8. A machine of the class specified having power drive means for giving it cycles of operation, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation performed when the carriage is in a predetermined columnar position, said control means including means presettable when the carriage is in a columnar position preceding and nonadjacent to said predetermined columnar position to cause said control means to render said carriage return means effective in a cycle of machine operation performed when said carriage is in a columnar position intermediate said predetermined and preceding columnar positions, and means controlled by said carriage for automatically causing said drive means to give the machine said cycle of operation when said carriage arrives in said intermediate columnar position.

9. A machine of the class specified having power drive means, a plurality of manipulative means for causing said drive means to drive said machine through cycles of operation, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation performed when the carriage is in a predetermined columnar position, said control means including means presettable under control of one of said manipulative means when the carriage is in a columnar position preceding and nonadjacent to said predetermined columnar position to cause said control means to render said carriage return means effective in a cycle of a machine operation performed when said carriage is in a columnar position intermediate said predetermined and preceding columnar positions, and means controlled by said carriage for automatically causing said drive means to give the machine said cycle of operation when said carriage arrives in said intermediate columnar position.

10. A machine of the class specified having power drive means for giving it cycles of operation, a member moved by said drive means during machine cycles, a traveling carriage movable to a plurality of columnar positions, carriage tabulating means, carriage return means, means controlled by said carriage in accordance with the positions thereof, and control means governed by said carriage-controlled means to enable said moved member to render said carriage return means effective in a cycle of machine operation performed when the carriage is in a predetermined columnar position, said control means including means presettable when the carriage is in a columnar position preceding and nonadjacent to said predetermined columnar position to cause said control means to enable said moved member to render said carriage return means effective in a cycle of machine operation performed when said carriage is in a columnar position intermediate said predetermined and preceding columnar positions, and means controlled by said carriage for automatically causing said cycling means to give the machine a cycle of operation when said carriage arrives in said intermediate columnar position.

11. A machine of the class specified having a power drive means, a plurality of manipulative means for causing said drive means to give the machine cycles of operation, a traveling carriage movable to a plurality of columnar positions, carriage tabulating means, carriage return means, means controlled by said carriage, and control means governed by said carriage-controlled means to render said carriage return means effective in a cycle of machine operation performed when the carriage is in a predetermined columnar position, means conditioned by one of said manipulative means when manipulated to initiate a machine cycle while the carriage is in a preceding columnar position to automatically cause said drive means to give the machine a further cycle of operation when the carriage reaches a columnar position intermediate said preceding and predetermined columnar positions, said control means including means presettable under control of said one of said manipulative means, when conditioned to cause said automatic machine cycle to be performed while the carriage is in said intermediate columnar position, to cause said control means to render said carriage return means effective in a cycle of machine operation performed when said carriage is in a columnar position between said intermediate and predetermined columnar positions.

12. A machine of the class specified having a power drive means, a plurality of manipulative means for causing said drive means to give the machine cycles of operation, a traveling carriage movable to a plurality of columnar positions, carriage tabulating means, carriage return means, means controlled by said carriage, and control means governed by said carriage-controlled means to render said carriage return means effective in a cycle of machine operation performed when the carriage is in a predetermined columnar position, means conditioned by one of said manipulative means when manipulated to initiate a machine cycle while the carriage is in a preceding columnar position to automatically cause said drive means to give the machine a further cycle of operation when the carriage reaches a columnar position intermediate said preceding and predetermined columnar positions, means controlled by said carriage for automatically causing said cycling means to give the machine a cycle of operation when said carriage arrives in a columnar position between said intermediate and predetermined columnar positions, said control means including means presettable under control of said one of said manipulative means, when conditioned to cause said automatic machine cycle to be performed while the carriage is in said intermediate columnar position, to cause said control means to render said carriage return means effective in the automatic cycle of machine operation performed when said carriage is in said columnar position between said intermediate and predetermined columnar positions.

13. A machine of the class specified having a power drive means, a plurality of manipulative means for causing said drive means to give the machine cycles of operation, a traveling carriage movable to a plurality of columnar positions, carriage tabulating means, carriage return means, means controlled by said carriage, control means including presettable means and governed by said carriage-controlled means to render said carriage return means effective in a cycle of machine operation performed when the carriage is in a predetermined columnar position, means conditioned by one of said manipulative means when manipulated to initiate a machine cycle while the carriage is in a preceding columnar position to automatically cause said drive means to give the machine a further cycle of operation when the carriage reaches a columnar position intermediate said preceding and predetermined columnar positions, means controlled by said carriage for automatically causing said cycling means to give the machine a cycle of operation when said carriage arrives in a columnar position between said intermediate and predetermined columnar positions, means conditioned by said one of said manipulative means, when the latter is conditioned to cause said automatic machine cycle when the carriage reaches said intermediate columnar position, to urge said presettable means to preset condition, and means normally restraining said presettable means from movement to preset condition and governed by said carriage-controlled means to release said presettable means for movement to preset condition when said carriage reaches said intermediate columnar position to cause said control means to render said carriage return means effective in the automatic cycle of machine operation performed when said carriage is in said columnar position between said intermediate and predetermined columnar positions.

14. A machine of the class specified having a power drive means, a plurality of manipulative means for causing said drive means to give the machine cycles of operation, a traveling carriage movable to a plurality of columnar positions, carriage tabulating means normally operating in each cycle of machine operation to tabulate said carriage to the next columnar position in one direction, carriage return means for returning said carriage in the opposite direction, means controlled by said carriage, control means governed by said carriage-controlled means to render said carriage return means effective in a cycle of machine operation performed when the carriage is in a predetermined columnar position, means conditionable by one of said manipulative means when manipulated to initiate a machine cycle while the carriage is in a preceding columnar position to control said tabulating mechanism to cause said carriage to skip tabulate to a columnar position intermediate said preceding and predetermined columnar positions, and repeat cycle means conditionable by said manipulation of said one of said manipulative means to cause said drive means to give the machine an automatic cycle of operation when said carriage reaches said intermediate columnar position, said control means including means presettable under control of said one of said manipulative means when manipulated to cause a machine cycle to be performed while the carriage is in said intermediate columnar position to cause said control means to render said carriage return means effective in a cycle of machine operation performed when said carriage is in a columnar position between said intermediate and predetermined columnar positions.

15. A machine of the class specified having a power drive means, a plurality of manipulative means for causing said drive means to give the machine cycles of operation, a traveling carriage movable to a plurality of columnar positions, carriage tabulating means normally operating in each cycle of machine operation to tabulate said carriage to the next columnar position in one direction, carriage return means for returning said carriage in the opposite direction, means controlled by said carriage, control means governed by said carriage-controlled means to render said carriage return means effective in a cycle of machine operation performed when the carriage is in a predetermined columnar position, means conditionable by one of said manipulative means when manipulated to initiate a machine cycle while the carriage is in a preceding columnar position to control said tabulating mechanism to cause said carriage to skip tabulate to a columnar position intermediate said preceding and predetermined columnar positions, and means conditionable by said manipulation of said one of said manipulative means and controlled by said carriage to cause said drive means to give the machine an automatic cycle of operation when said carriage reaches said intermediate columnar position, said control means including means presettable under control of said manipulative means, when manipulated to cause said automatic machine cycle to be performed, to condition said control means to render said carriage return means effective in a cycle of machine operation performed when said carriage is in a columnar position between said intermediate and predetermined columnar positions.

16. A machine of the class specified having a power drive means, a plurality of manipulative means for causing said drive means to give the machine cycles of operation, a traveling carriage movable to a plurality of columnar positions, carriage tabulating means normally operating in each cycle of machine operation to tabulate said carriage to the next columnar position in one direction, carriage return means for returning said carriage in the opposite direction, means controlled by said carriage, control means governed by said carriage-controlled means to render said carriage return means effective in a cycle of machine operation performed when the carriage is in a predetermined columnar position, means conditionable by one of said manipulative means when manipulated to initiate a machine cycle while the carriage is in a preceding columnar position to control said tabulating mechanism to cause said carriage to skip tabulate to a columnar position intermediate said preceding and predetermined columnar positions, means controlled by said carriage for automatically causing said cycling means to give the machine a cycle of operation when said carriage arrives in a columnar position between said intermediate and predetermined columnar positions, and means conditionable by said manipulation of said one of said manipulative means, and controlled by said carriage to cause said drive means to give the machine an automatic cycle of operation when said carriage reaches said intermediate columnar position, said control means including means presettable under control of said manipulative means when manipulated to cause the automatic machine cycle to be performed while the carriage is in said intermediate columnar position to condition said control means to render said carriage return means effective in the automatic cycle of machine operation performed when said carriage is in said columnar position between said intermediate and predetermined columnar positions.

17. A machine of the class described having power drive means for giving it cycles of operation, a traveling carriage movable to a plurality of columnar positions, carriage tabulating means normally operating during machine cycles to tabulate the carriage in one direction, skip-tabulating means controlling said tabulating means to cause skip tabulation of said carriage, carriage return means, control means governed by said carriage to cause said carriage return means to return said carriage from a predetermined columnar position, repeat cycle means controlled in part by said carriage, and a single manipulative member controlling said skip-tabulating means, said repeat cycle means and a portion of said carriage governed control means and operable with the carriage in at least one of its columnar positions to cause said skip-tabulating means to cause the carriage, in a machine cycle initiated when the carriage is in said columnar position, to skip tabulate to a nonadjacent subsequent columnar position preceding said predetermined columnar position, to enable said repeat cycle means to cause said drive means to give the machine an automatic cycle of operation when the carriage is in said subsequent columnar position and to condition a portion of said carriage governed control means to render said carriage return means effective in a machine cycle, performed when said carriage is in a columnar position intermediate said subsequent and said predetermined columnar positions.

18. A machine of the class specified having a power drive means, a plurality of manipulative means for causing said drive means to give the machine cycles of operation, a traveling carriage movable to a plurality of columnar positions, carriage tabulating means, carriage return means, means controlled by said carriage in accordance with the positions thereof, and control means governed by said carriage-controlled means to render said carriage return means effective in a cycle of machine operation initiated when the carriage is in a predetermined columnar position, said control means including means presettable by a predetermined one of said manipulative means when conditioned to initiate a machine cycle when the carriage is in a columnar position preceding and nonadjacent to said predetermined columnar position and means controlled by another of said manipulative means to enable said control means to render said carriage return means effective in a cycle of machine operation initiated by said other manipulative means when said carriage is in columnar position intermediate said predetermined and preceding columnar positions.

19. A machine of the class specified having power drive means for giving it cycles of operation, a traveling carriage movable to a plurality of columnar positions, carriage tabulating means, means controlled by said carriage for automatically causing said drive means to give the machine said cycle of operation when said carriage arrives in a predetermined columnar position, carriage return means, means controlled by said carriage in accordance with the positions thereof, and control means governed by said carriage-controlled means to render said carriage return means effective in a cycle of machine operation performed when the carriage is in a subsequent predetermined columnar position, said control means including means governed by a portion of said first-mentioned carriage-controlled means and means presettable when the carriage is in a columnar position preceding said first-mentioned predetermined columnar position to cause said control means to render said carriage return means effective in said automatically caused cycle of machine operation.

20. A machine of the class specified having a traveling carriage movable to a plurality of columnar positions, means to tabulate said carriage in one direction, power operated means to return said carriage in the opposite direction, control means to render said return means effective to return said carriage, presetting means, and means controlled by said carriage to be rendered presettable by said presetting means when said carriage is in a predetermined columnar position and, when preset, to condition said control means when said carriage is in a columnar position intermediate said predetermined columnar position and a final columnar position to render said carriage return means effective, said carriage controlled means being conditioned by said carriage when the latter is in said final columnar position to condition said control means to render said carriage return means effective.

21. A machine of the class specified having means to drive said machine through cycles of operation, an element actuated from said drive means in machine cycles, a traveling carriage movable to a plurality of columnar positions, means to tabulate said carriage in one direction to successive columnar positions in successive machine cycles, skip means to cause said carriage to skip tabulate through a number of columnar positions in a machine cycle, manipulative skip control means to place said skip means in skip tabulating condition, power operable means to return said carriage in the opposite direction, normally ineffective control means to render said return means effective to return said carriage, means controlled by said carriage to cause said normally ineffective control means to be actuated by said element in a machine cycle performed with said carriage in a predetermined columnar position to render said return means effective, said carriage-controlled means including a portion rendered presettable under control of said skip control means when said carriage is in a columnar position preceding and non-adjacent to said predetermined columnar position to cause said normally ineffective control means to be actuated by said element to render said return means effective in a machine cycle performed with said carriage in an intermediate columnar position, and means controlled by said carriage to restore said skip means to non-skip condition prior to arrival of said carriage in said intermediate columnar position.

22. A machine of the class specified having means to drive said machine through cycles of operation, an element actuated from said drive means in machine cycles, a traveling carriage movable to a plurality of columnar positions, means to tabulate said carriage in one direction to successive columnar positions in successive machine cycles, skip means to cause said carriage to skip tabulate through a number of columnar positions in a machine cycle, manipulative skip control means to place said skip means in skip tabulating condition, power operable means to return said carriage in the opposite direction, normally ineffective control means to render said return means effective to return said carriage, means controlled by said carriage to cause said normally ineffective control means to be actuated by said element in a machine cycle performed with said carriage in a predetermined columnar position to render said return means effective, said carriage-controlled means including a portion rendered presettable under control of said skip control means when said carriage is in a columnar position preceding and non-adjacent to said predetermined columnar position to cause said normally ineffective control means to be actuated by said element to render said return means effective in a machine cycle performed with said carriage in an intermediate columnar position, and means controlled by said carriage to restore said skip means to non-skip condition prior to arrival of said carriage in either of said preceding and intermediate columnar positions.

23. A machine of the class specified having means to drive said machine through cycles of operation, a traveling carriage movable to a plurality of columnar positions, means to tabulate said carriage in one direction to successive columnar positions in successive machine cycles, skip means to cause said carriage to skip tabulate through a number of columnar positions in a machine cycle, manipulative skip control means to place said skip means in skip tabulating condition, power operable means to return said carriage in the opposite direction, normally ineffective control means to render said return means effective to return said carriage, means controlled by said carriage to cause said control means to render said return means effective in a machine cycle performed with said carriage in a predetermined columnar position, said carriage-controlled means including a portion rendered presettable under control of said skip control means when said carriage is in a columnar position preceding and non-adjacent to said predetermined columnar position to cause said normally ineffective control means to render said return means effective in a machine cycle performed with said carriage in an intermediate columnar position, means controlled by said carriage to restore said skip means to non-skip condition prior to arrival of said carriage in either of said preceding and intermediate columnar positions, means conditionable by said skip control means when manipulated with said carriage in a columnar position ahead of said preceding columnar position to cause said drive means to drive said machine through an automatically initiated machine cycle upon arrival of said carriage in said preceding columnar position, and means controlled by said manipulative skip control means to retain the latter in manipulated condition during said automatically initiated cycle.

24. A machine of the class specified having means to drive said machine through cycles of operation, a traveling carriage movable to a plurality of columnar positions, means to tabulate said carriage to successive columnar positions in one direction in successive machine cycles, power operable means to return said carriage in the opposite direction, normally ineffective control means to render said return means effective, means controlled by said carriage to cause said control means to render said return means effective in a machine cycle performed with said carriage in a predetermined columnar position, a manipulative means, said carriage-controlled means including a portion rendered presettable under control of said manipulative means when said carriage is in a columnar position preceding and non-adjacent to said predetermined columnar position to cause said normally ineffective control means to render said return means effective in a machine cycle performed with said carriage in a columnar position intermediate said predetermined and preceding columnar positions, means conditionable by said manipulative means with said carriage in a columnar position ahead of said preceding columnar position to cause said drive means to drive said machine through an automatically initiated machine cycle upon arrival of said carriage in said preceding columnar position, and means conditionable by said manipulative means when manipulated with said carriage in said columnar position ahead of said preceding columnar position to retain said manipulative means in presetting condition during said automatic machine cycle.

ARTHUR J. FETTIG.